United States Patent
Esswie

(10) Patent No.: US 12,477,382 B2
(45) Date of Patent: Nov. 18, 2025

(54) ADAPTIVE DOWNLINK DEVICE AGGREGATION

(71) Applicant: Dell Products, L.P., Round Rock, TX (US)

(72) Inventor: Ali Esswie, Montreal (CA)

(73) Assignee: Dell Products L.P., Round Rock, TX (US)

( * ) Notice: Subject to any disclaimer, the term of this patent is extended or adjusted under 35 U.S.C. 154(b) by 271 days.

(21) Appl. No.: 18/069,137

(22) Filed: Dec. 20, 2022

(65) Prior Publication Data

US 2024/0205730 A1    Jun. 20, 2024

(51) Int. Cl.
*H04W 28/02* (2009.01)
*H04W 52/02* (2009.01)
(Continued)

(52) U.S. Cl.
CPC ... *H04W 28/0268* (2013.01); *H04W 52/0229* (2013.01); *H04W 68/005* (2013.01); *H04W 88/04* (2013.01)

(58) Field of Classification Search
CPC ......... H04W 28/0268; H04W 52/0229; H04W 88/04; H04W 68/005; H04W 68/02
See application file for complete search history.

(56) References Cited

U.S. PATENT DOCUMENTS

2017/0244469 A1    8/2017  Seo et al.
2020/0015192 A1    1/2020  Chun
(Continued)

FOREIGN PATENT DOCUMENTS

EP    3 229 549    10/2017
EP    3 628 133    4/2020
WO    2018202798   11/2018

OTHER PUBLICATIONS

Technical specifications (TS) 38.201—"5G; NR; Physical layer; General description", 3GPP TS 38.201 version 15.0.0 Release 15, Sep. 2018, 14 pages.

(Continued)

*Primary Examiner* — Robert C Scheibel
(74) *Attorney, Agent, or Firm* — Amin, Turocy & Watson, LLP

(57) ABSTRACT

In a sidelink aggregation group, a primary user equipment may receive from one or more secondary user equipment user equipment information that may comprise device identifiers, flow identifiers, flow quality indicators, decoding information, or decrypting information. The primary user equipment may transmit the user equipment information to a radio access network node in an aggregation request. The node may respond with a paging alignment response signaling message that may indicate that paging indications for one or more of the secondary user equipment are accepted to be aligned/combined in an aggregation downlink message. The primary user equipment may wake up to decode an aggregation downlink message at a scheduled paging occasion, and while awake decode paging occasions, directed to secondary user equipment, contained in the aggregation downlink message. Data traffic directed to a secondary user equipment may be transmitted to a primary user equipment at a data rate corresponding thereto.

20 Claims, 13 Drawing Sheets

(51) Int. Cl.
*H04W 68/00* (2009.01)
*H04W 88/04* (2009.01)

(56) References Cited

U.S. PATENT DOCUMENTS

| | | | |
|---|---|---|---|
| 2020/0077253 | A1 | 3/2020 | Kim et al. |
| 2022/0110141 | A1* | 4/2022 | Kwak .................... H04W 76/28 |
| 2023/0217495 | A1* | 7/2023 | Xu .................... H04W 52/0235 370/329 |
| 2024/0098733 | A1* | 3/2024 | Wang .................... H04L 1/1812 |
| 2024/0214869 | A1* | 6/2024 | Sha .................... H04W 28/0268 |
| 2025/0016052 | A1* | 1/2025 | Chen .................... H04W 76/15 |

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
International Search Report and Written Opinion mailed Feb. 12, 2024 for PCT Application No. PCT/US2023/035955, 25 pages.
Notification concerning transmittal of International Preliminary Report on Patentability for PCT Application No. PCT/US2023/035955, mailed Jul. 3, 2025, 16 pages.
European Office Action for European Patent Application 23810204.0 mailed Jul. 29, 2025, 3 pages.

* cited by examiner

1000

ADAPTIVE DOWNLINK DEVICE AGGREGATION

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., may permit higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Sidelink communications may facilitate a variety of cellular use-cases such as autonomous vehicle crash avoidance, public avoidance, coordinated vehicle cruise control, and the like, where devices become able to communicate and coordinate directly with each other without communication messaging and signaling going through the RAN network. This is particularly important in cases where some of or all user equipment that coordinate as part of a sidelink group are located beyond RAN wireless coverage. User equipment devices may also communicate with one another via other means, such as, for example, Wi-Fi, Bluetooth, and the like.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprising transmitting, by a first user equipment comprising a processor to a radio access network node, an aggregation request comprising a request that the radio access network node transmit at least one second downlink traffic portion directed to a second user equipment in at least one aggregation downlink message, which may be directed to the first user equipment; and receiving, by the first user equipment from the radio access network node, a first aggregation downlink message directed to the first user equipment. The first aggregation downlink message may be received in response to the transmitting of the aggregation request. Before transmitting the first aggregation downlink message, a network RAN may reply to the aggregation request an with paging alignment response signaling message which may indicate to the requesting first user equipment, which may comprise a primary user equipment of an aggregation group, whether paging indications for all of, some of, or none of UE devices requested/identified in request the aggregation request are accepted by the RAN for combining/aligning in an aggregation downlink message. Thus, the primary, or first, user equipment may attempt blind decoding for paging indication occasions only for accepted secondary user equipment devices in addition to decoding of the first aggregation downlink message, which may be an occasion scheduled for the first user equipment. The example method embodiment may further comprise decoding, by the first user equipment, the first aggregation downlink message according to first decoding information corresponding to the first user equipment; decoding, by the first user equipment, a downlink traffic portion, from the first aggregation downlink message and directed to the second user equipment, according to second decoding information corresponding to the second user equipment; and causing the second user equipment to wake up from a sleep mode based on the decoding by the first user equipment of the downlink traffic portion. The awakened second user equipment may establish a connection with the radio access network node based on a paging indication contained in the decoded downlink traffic portion.

The receiving of the first aggregation downlink message may comprise waking up, by the first user equipment, from a sleep state according to a configured first downlink paging occasion resource corresponding to the first user equipment. The first paging occasion resource may be a scheduled time or frequency for the first user equipment to wake up and attempt to decode to determine whether the first aggregation downlink message comprises a paging indication for the first user equipment.

The decoding of the first aggregation downlink message and the decoding of the downlink traffic portion may result from the waking up from the sleep state according to the configured first downlink paging occasion resource. The second decoding information comprises a scrambling code corresponding to the second user equipment. The second decoding information comprises a decryption key corresponding to the second user equipment.

In an embodiment, the downlink traffic portion may be a first downlink traffic portion, wherein the aggregation request is a first request, and wherein the aggregation request comprises a second request that the radio access network node transmit at least one second downlink traffic portion directed to a third user equipment in the at least one aggregation downlink message directed to the first user equipment.

In an embodiment, the method may further comprise decoding, by the first user equipment, a second downlink traffic portion, from the first aggregation downlink message and directed to the third user equipment, according to third decoding information corresponding to the third user equipment; and causing the third user equipment to wake up from a sleep state based on the decoding by the first user equipment of the second downlink traffic portion.

In another embodiment, the method may comprise, in further response to the transmitting, receiving, by the first user equipment from the radio access network node, a second aggregation downlink message; decoding, by the first user equipment, the second aggregation downlink message according to the first decoding information corresponding to the first user equipment; decoding, by the first user equipment, a second downlink traffic portion, from the second aggregation downlink message and directed to the third user equipment, according to third decoding information corresponding to the third user equipment; and causing the third user equipment to wake up from a sleep state based on the decoding by the first user equipment of the second downlink traffic portion.

The method may further comprise receiving, by the first user equipment, data traffic directed to the second user equipment according to a data rate or an encoding scheme corresponding to a radio condition corresponding to the first user equipment; and transmitting, by the first user equipment to the second user equipment, the data traffic, wherein the downlink traffic portion is different from the data traffic.

In yet another embodiment, the request may be a first request, and the aggregation request may comprise a second request that the radio access network node transmit data traffic, having a determined quality of service that satisfies a configured quality of service criterion and that is directed to the second user equipment, to the first user equipment for retransmission by the first user equipment to the second user equipment. The method may further comprise receiving, by the first user equipment, a data traffic portion, having the determined quality of service and that is directed to the second user equipment; and transmitting, by the first user equipment to the second user equipment, the data traffic portion, wherein the downlink traffic portion is different from the data traffic portion. The configured quality of service criterion comprises a latency value. The configured quality of service criterion comprises an application type corresponding to an application, executing on the second user equipment, to which the data traffic portion is directed. The application type comprises a type associated with a virtual reality capability.

In a relay user equipment embodiment, a user equipment may act as a relay/primary user equipment in an aggregation group of user equipment device. The relay user equipment may comprise a processor configured to: receive, from a tethered user equipment tethered to the relay user equipment, tethering decoding information corresponding to the tethered user equipment; decode an aggregation downlink paging indication message, which was directed to the relay user equipment by a radio access network node; retrieve, from the aggregation downlink paging indication message, a tethered downlink paging indication directed to the tethered user equipment according to the tethering decoding information; and transmit the tethered downlink paging indication to the tethered user equipment.

The processor may be further configured to: receive data traffic directed to the tethered user equipment; and transmit the data traffic according to at least one downlink resource indicated in the tethered downlink paging indication.

The processor may be further configured to: receive data traffic directed to the tethered user equipment according to a data rate or an encoding scheme corresponding to one or more network radio conditions corresponding to the relay user equipment; and transmit the data traffic to the tethered user equipment.

In a machine-readable medium embodiment, a non-transitory machine-readable medium may comprise executable instructions that, when executed by a processor of a first user equipment, facilitate performance of operations, comprising: receiving second decoding information corresponding to a second user equipment; transmitting, to a radio access network node, an aggregation request comprising a request that the radio access network node transmit one or more downlink paging indications directed to the second user equipment in one or more aggregation downlink paging indication messages directed to the first user equipment. In response to the transmitting, the executable instructions, when executed by the processor of the first user equipment, may facilitate performance of operations, comprising receiving from the radio access network node, an aggregation downlink paging indication message directed to the first user equipment; determining, according to the second decoding information, that the aggregation downlink paging indication message comprises a second downlink paging indication directed to the second user equipment. The operations may further comprise causing the second user equipment to wake up from a sleep mode based on the aggregation downlink paging indication message comprising the second downlink paging indication; and transmitting the second downlink paging indication to the second user equipment.

In an embodiment, the operations may further comprise receiving data traffic directed to the second user equipment; and transmitting the data traffic according to one or more downlink resources indicated in the second downlink paging indication.

In another embodiment, the operations may further comprise receiving data traffic directed to the second user equipment according to a data rate or an encoding scheme corresponding to one or more network radio conditions corresponding to the first user equipment; and transmitting the data traffic to the second user equipment. The data traffic have a determined quality of service that satisfies a quality-of-service criterion specified in the aggregation request, or that has been previously configured at the radio access network node.

DETAILED DESCRIPTION OF THE DRAWINGS

Figure 1:
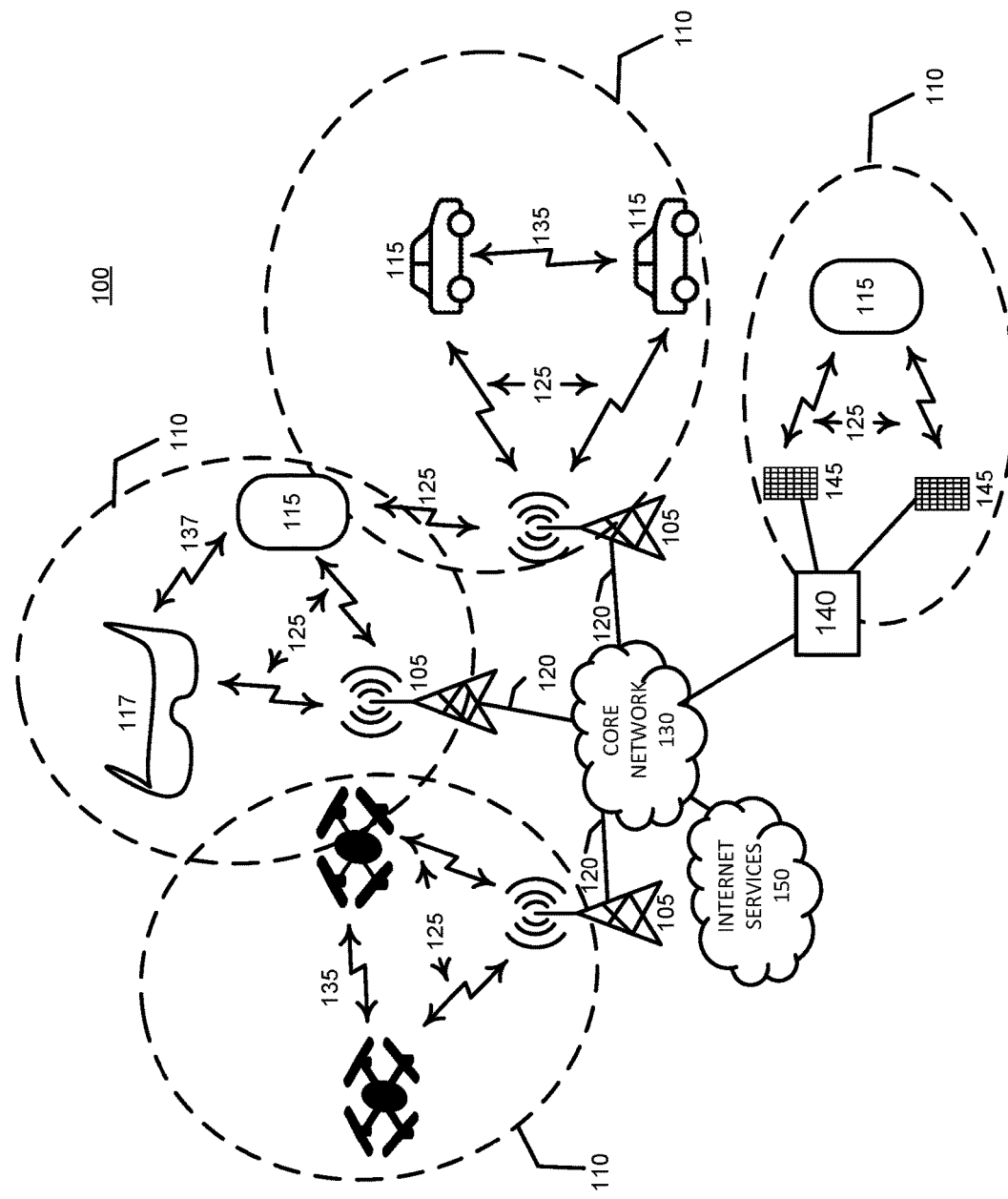
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

The PDCCH of a 5G NR system may deliver downlink and uplink control information to cellular devices. Compared to the control channel design of the fourth generation (e.g., LTE), the 5G control channel can match requirements of the URLLC and eMBB use cases and can offer an efficient coexistence between those different QoS classes.

The 5G PDCCH channel, unlike the Fourth Generation control channel, may be beamformed using favored-channel vectors of each UE, with embedded demodulation-assisting demodulation reference signals ("DMRS"). The PDCCH may be modulated by a fixed QPSK modulation scheme and with a conservative coding rate such as the reliability of receiving the PDCCH channel at a UE device is maximized. For example, to satisfy a URLLC 10e-5 reliability level, the PDCCH channel decoding ability may be enhanced at the device end.

The resource size of each PDCCH channel, which may be carrying the downlink control information ("DCI") of one or more UEs, may be time-varying, and may be referred to as PDCCH aggregation level. In particular, and to enhance PDCCH decoding, the network may increase the resource size of the PDCCH channel and accordingly adopt a more conservative and resource-less-efficient coding rate of the PDCCH. This implies that same amount of PDCCH control information is transmitted with a stronger coding rate (i.e., more redundant bits for error detection and correction) at the expense of consuming more channel resources for transmitting the PDCCH information.

There are two types of PDCCH channels. First, the UE-specific PDCCH, where a set channel resources are periodically monitored by a single UE/device. After being configured, the device will attempt to blindly decode those candidate resources in case they may be potentially carrying DCI information. This DCI information includes configurations on scheduled uplink or downlink grants, transmission configurations, and information on common system signaling and updates. Furthermore, the blind decoding is the process when the UE attempts decoding the DCI with all possible transmission configurations and aggregation levels. This implies a heavy power consumption on the device end; however, it is necessary because the UE is not yet aware about the actual configurations of the PDCCH channel and corresponding transmissions. It shall be aware of such after it successfully decodes the PDCCH. In the active mode, the UE may monitor the configured one or more PDCCH search spaces, where a search space implies a set of candidate resources that may carry the PDCCH/DCI information. The search space definitions may be used to refer to varying size of the PDCCH channel (i.e., aggregation levels) and hence, the required size of resources to carry the PDCCH may vary.

Common PDCCH search spaces are monitored by all UEs. Those common PDCCH channels typically carry DCI information that are relevant to all devices. Examples include system updates and control information, all-UE power control information, and general system information.

For each scheduled downlink or uplink transmission, there typically is a preceding PDCCH control transmission informing the UE device about resources scheduled by the network for the transmission, and transmission configurations to use for transmission in the uplink or reception in the downlink. Accordingly, the PDCCH transmissions are considered as signaling overhead, which should be always minimized, and needed for successful device transmission and/or reception.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to 5 Mbps URLLC link with a 1 ms radio budget, some XR applications need 100 Mbps links with a couple of milliseconds of the allowed radio latency. Thus, 5G radio design and associated procedures may be adapt to the new XR QoS class and associated targets.

XR service may be facilitated by traffic having certain characteristics associated with the XR service. For example, XR traffic may typically be periodic with time-varying packet size and packet arrival rate. In addition, different packet traffic flows of a single XR session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

Sidelink communications refers to cellular devices communicating with each other directly, without having to go through a serving RAN node, by establishing a sidelink communication link. However, a RAN node may or may not control how sidelink resources are being reserved and dictated by different sidelink devices. In one sidelink radio resource management option, sidelink devices are configured to always request a sidelink resource towards another sidelink device from the serving RAN node. This requires that at least, the transmitting sidelink node to be within the coverage of the serving node. Furthermore, the sidelink-experienced communication latency clearly increases due to the additional transmission of the RAN scheduling request and reception of the corresponding scheduling grant before the sidelink scheduling and transmission are triggered. Advantageously, this reduces the possibility of sidelink channel collisions.

In another radio resource management option, sidelink devices are configured to autonomously sense the sidelink channel resources, determine which sidelink resource are reserved for other devices' sidelink transmissions, and determine which resource set is free/available for their own transmission. The channel sensing rules and high-level channel sensing configurations are indicated from the RAN network. Therefore, the sidelink control channel has been designed to support efficient channel sensing over the sidelink interface. In particular, the sidelink control channel is designed in a two-stage format. The first stage carries a first stage sidelink control information ("SCI") and the second stage carries a second stage SCI.

The first stage SCI is similar to the RAN downlink control information ("DCI") and may carry the following information elements: scheduling information of a reserved data resource for a sidelink transmission of interest, and scheduling resource information of the second stage SCI that carries the transmission-specific configuration of the sidelink data channels.

Accordingly, sidelink devices attempt blindly decoding of the first stage SCI to determine which sidelink data resource will be reserved by which sidelink device in proximity. However, the sensing sidelink device cannot determine whether an actual sidelink data payload is destined for it, thus a sidelink device decodes the second stage SCI. The second stage SCI carries the following information elements: source device and destination device identifiers of the sidelink transmission, and sidelink transmission configurations including modulation schemes, coding schemes, and HARQ feedback information.

Therefore, a sidelink device monitors and blindly decodes the first stage SCI to determine the reserved channel resources for the associated sidelink transmission, determines transmission configurations of the second stage SCI, and decodes the second stage SCI to determine if a corresponding sidelink transmission is destined for it. If a sidelink device is a transmit-only device (e.g., an M2M device), the device need only receive and blindly decode the first stage SCI, while skipping decoding of the second stage SCI, in which case channel sensing may only comprise monitoring, detection, and blind decoding of the first stage SCI.

There are two modes of channel sensing. First, continuous channel sensing may be configured such that a control channel of the sidelink interface signaling can flexibly be placed at any time instant such that a sensing sidelink device needs to always search and monitor for a control channel that is carrying the first stage SCI. Second, and due to the significant power consumption burden of the continuous sensing, a partial channel sensing procedure may be implemented, such that the sidelink control channel is configured to be periodically, or non-periodically, transmitted during predefined time instants, and accordingly, sensing sidelink device need only monitor and blindly decode those timing and frequency instants while possibly deep sleeping otherwise.

Sidelink relays are sidelink devices that are performing sidelink and RAN functions on behalf of, or for the sake of, other remote sidelink devices in proximity to the sidelink relay. Sidelink relays offers a wide set of sidelink functions for remote sidelink devices including channel granting, multi-hop traffic relaying, or paging monitoring. Thus, less capable sidelink remote devices obtain several performance advantages such as power saving gains, and sidelink and RAN network coverage extension. Accordingly, there are two modes which a sidelink relay device may adopt for announcing their presence for remote devices in proximity. In one variant, sidelink relays explicitly announce their presence using a preconfigured discovery procedure. During the configured discovery period, sidelink relay broadcasts an announcement message that indicates their presence and their associated relaying configurations. Remote devices receive a relay's discovery messages and, upon interest in becoming part of, or a member of, a sidelink zone, or group, that includes the relay, initiate a direct communication link with the sidelink relay.

In another discovery variant, a sidelink remote device proactively transmits a discovery message requesting that sidelink relays in proximity announce their presence and corresponding relaying services. This option offers the advantage of the on-demand discovery signaling where sidelink relays avoid transmitting unnecessary discovery messages that may not be utilized by present remote devices in proximity.

Layer-2 relaying denotes that the end-to-end protocol stack and QoS targets over sidelink interface will not be interrupted at the relay, e.g., the relay alters lower layer headers to perform traffic relaying. Thus, with layer-2 relays, the end-to-end QoS and flows can be tracked and maintained. However, for layer-3 relaying, the end-to-end QoS is lost at the relay side because the latter alters and translates the original QoS flows metrics to corresponding relay-specific metrics.

Sidelink discontinuous reception ("DRX") cycle and channel partial sensing partially address the issue of device battery consumption. A sidelink device is configured with a DRX cycle that consists of a period of monitoring control channels to determine if there is a scheduled sidelink reception, and a period of deep sleeping such that power consumption of the sidelink device is optimized. Unlike RAN DRX procedures, sidelink inter-device coordination procedures must be in place for sidelink DRX, due to the distributed nature of the sidelink interface. For example, a sidelink device my transmit a sidelink scheduling information towards another sidelink device in proximity that is currently deep sleeping, leading to the sleeping device missing the detection of the scheduling information, and accordingly, increasing the sidelink transmission latency. Thus, sidelink devices in proximity coordinate on DRX cycles that are common at least between device pairs of interest.

Regarding partial channel sensing, sidelink devices implementing continuous channel sensing need to always monitor sidelink control channels for potential scheduled transmissions, which results in significant battery power consumption due to the frequent blind decoding attempts. With partial channel sensing and sidelink DRX, the scheduling of the control channel is preconfigured during certain periodic occasion that sidelink devices expect to perform channel sensing. Thus, partial channel sensing enables sidelink devices to deep sleep over extended periods of time, even during a sidelink DRX channel wake period.

However, due to the functionality that the sidelink relays perform, power consumption is exacerbated for sidelink relays compared to non-relay sidelink UEs. That is, a sidelink relay needs to perform RAN-like procedures as well as sidelink functions for the relay device itself and its connected remote sidelink devices, leading to significant battery consumption. A sidelink relay relays traffic and performs RAN/sidelink functions on behalf of the connected remote sidelink devices. A sidelink relay may monitor and decode RAN/sidelink paging on behalf of remote devices. The higher the number of remote devices that are connected to the relay as part of a sidelink group, or zone, the more the number of paging occasions the sidelink relay monitors, detects, and decodes, which consumes battery power of the sidelink relay at a high rate. In addition, a sidelink relay may perform sidelink routing and relaying of traffic towards not-in-RAN-coverage sidelink devices. A sidelink relay device may also perform continuous and/or partial channel sensing on behalf of connected in-coverage remote sidelink devices. Such upgraded, or additional, functionality of sidelink relay devices introduces a power consumption limitation at the device end. Thus, power saving optimization procedures are desirable to enhance battery charge/energy availability at battery powered sidelink relays.

User equipment devices of a multi-device aggregation group may dynamically coordinate among each other to perform a certain function at a certain device or to relax a certain radio function from a certain coordinating device. For example, one of the group of user equipment devices can function as a relay device that communicates with a RAN serving the members of the group. The relay UE may be referred to as a relay UE or as a primary UE. The other members of the group may be referred to as remote, secondary, or tethered UE devices. Device aggregation and corresponding device-to-device signaling exchange can be executed over a sidelink interface, which may follow, for example, a $3^{rd}$ Generation Partnership Project ("3GPP") specification, or via device implementation-specific communication links. Thus, a primary user equipment device can periodically monitor incoming calls and/or paging indications on behalf of one or more other coordinating secondary user equipment devices of a group that have delegated some radio functionality to a primary user equipment, for example waking up and monitoring downlink paging indication message, and a delegating user equipment device may then only wake up when there is an incoming call or and incoming downlink paging indication traffic portion of a downlink data traffic portions, such as a packet, or a stream or flow of packets, directed to the remote/secondary device. Such delegating of monitoring downlink paging indications may facilitate significant power saving of a secondary device's battery charge level. However, further benefits of device aggregation may accrue if a serving network RAN is aware of delegating of functionality among coordinating aggregating user equipment devices. For example, a network RAN that has awareness of aggregation coordination among a primary UE device and one or more remote secondary UE devices, which may have delegated monitoring of downlink paging indication to the primary/relay UE, can dynamically align downlink paging resource occasions corresponding to the primary/relay/delegated device with one or more paging resource occasions of secondary devices by modifying the assigning of different paging resource occasions to respective different devices. Such aligning of paging indications, which may comprise combining of paging indications may result in primary devices avoiding waking up to monitor paging indications during paging indication resource occasions corresponding to the relay/primary UE device, going back to sleep, and then also waking up to monitor paging occasions configured for the remote UE devices of the group of delegating remote devices that have delegated monitoring of downlink paging indication resources to the relay/primary UE device of the group. Not only does reducing the number of occasions a relay device wakes up and monitors downlink paging indications reduce power consumption by the secondary devices because they do not wake up and attempt blind decoding of configured resource occasions that may not contain downlink paging indications, but by minimizing the number of times a primary device wakes up and attempts blind decoding of downlink paging resource occasions power consumption at the primary UE device is also reduced. (It will be appreciated that blind decoding of a paging indication typically consumes more power than a decoding an occasion configured for a device because the device may attempt to decode a paging indication with multiple scrambling codes, each of which attempts consumes processor operations and thus power.) Embodiments disclosed herein facilitate efficient downlink device aggregation, and performing one or more multiple radio aspects, including coordinated downlink paging reception and traffic-flow-aware downlink traffic splitting. User equipment devices in embodiments disclosed herein may, within a device aggregation group, report dynamic indications regarding device and function aggregation setup such that a serving network RAN can become aware of the aggregation and may be able to dynamically adjust resources for device-group downlink transmission to increase operational performance, such as reduction of battery charge consumption, at members of an aggregation group of UE devices, including at a primary UE device of the aggregation group.

Device aggregation facilitates members of a group of user equipment devices to collaborate/coordinate performing of one or more functions for one or more of the coordinating devices. Device-to-device communications and respective signaling can be performed over standardized sidelink interface or over device-specific communication links. Embodiments disclosed herein facilitate network support of aggregation schemes to perform efficient radio function aggregation in which primary/relay devices (e.g., aggregated or delegated devices) perform radio functions or receive or transmit radio traffic on behalf of secondary devices (e.g., delegating devices). Instead of a primary aggregated device performing a separate random access process on behalf of each of multiple connected secondary devices, (e.g., transmitting multiple preambles, multiple radio resource control (RRC) connection requests, and receiving multiple independent RRC connection setup responses), a primary device may perform the random access process once for an aggregation downlink message that may comprise a paging indication for the primary device and also a paging indication for one or more of the secondary UE devices. The paging indications for the secondary UE devices may be transmitted according to time or frequency resource occasions that have been adjusted by a RAN serving an aggregation group such that the primary UE can monitor and decode paging indications directed to one or more secondary UE devices of an aggregation group of UE devices without the primary UE going to sleep after monitoring and decoding a paging indication occasions (which may be an occasion that comprises a paging indication directed to the primary UE) and waking back up to monitor and decode occasions that may comprise paging indications directed to one or more of the secondary UE devices of the aggregation group of UE devices. For example, multiple occasions that may contain multiple paging indications for multiple UE devices of an aggregation group may be contained in, or indicated by, an aggregation downlink message that may begin at an occasion scheduled for a primary UE device to wake up, monitor, and attempt to blindly decode for a paging indication directed to the primary UE device.

With device aggregation embodiments disclosed herein, a group of user equipment devices may coordinate regarding a certain radio function for one or more user equipment devices to optimize capacity and power saving gains. Awareness by a network RAN may facilitate procedures for coordinated paging decoding and adaptive downlink traffic splitting.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times, UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a, handheld device, or a, subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 ray wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g. LTE, LTE-A, LTE-A Pro. NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (g, an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carder bandwidth may be referred to as a "system bandwidth" of the carrier or the wireless communication system 100. For example, the carrier bandwidth may be one of a number of determined bandwidths for carriers of a particular radio access technology (e.g. 1, 4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)), in a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g. spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various technique. A physical control channel and a physical data channel nay be multiplexed on a downlink carrier, for example, using one or more of time division multiplexing (TDA) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID) a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g. UEs 115 in a closed subscriber group (CSG). UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a roving geographic coverage area 110. In some examples, different geographic coverage areas 110 associated with different technologies may overlap, but the different geographic coverage areas 110 ray be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g. set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 11_5 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many 1:M system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 nay be an evolved packet core (EPC) or 5G core (5GC), which may include at least one control plane entity that manages access and mobility (e.g., a mobility management entity (MME), an access aid mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g. radio heads and ANCs) or consolidated into a single network device (e.g., a base station 105).

The wireless communication system 100 may operate using one or more frequency bands, typically in the range of 300 megahertz (M-z) to 300 gigahertz (GHz). Generally, the region from 300 MHz to 3 GHz is known as the ultra-high frequency (UHF) region or decimeter band because the wavelengths range from approximately one decimeter to one meter in length. The L-UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHZ to 30 GHz, also known as the centimeter band, or in an extremely high frequency (EHF) region of the spectrum (e.g., from 30 GHz, to 300 GHz, also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SH F or UHF transmissions. The techniques disclosed herein nay be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance, in some examples, operations in unlicensed bands may be based on a carrier aggregation configuration in conjunction with component carriers operating in a licensed band (e.g. LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a. UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIME) (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that nay be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the U E 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more bean directions, and the feedback may correspond to a configured number of beams across a system bandwidth or one or more sub-bands. A base station 105 may transit a reference signal (e.g., a cell-specific reference signal (CR-S), a channel state information reference signal (CSI-RS)), which may be precoded or unprecoded. A TIE 115 may provide feedback for beam selection, which may be a precoding matrix indicator (EMI) or codebook-based feedback (e.g., a multi-panel type codebook, a linear combination type codebook, a port selection type codebook). Although these techniques are described with reference to signals transmitted in one or more directions by a base station 105, a UAE 115 may employ similar techniques for transmitting signals multiple times in different directions (e.g., for identifying a beam direction for subsequent transmission or reception by the UE 115) or for transmitting a signal in a single direction (e.g. for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SN R), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Aligned/combined downlink paging monitoring and detection.

Embodiment disclosed herein may dynamically align paging occasions of multiple devices of an aggregation group with a paging indication occasion corresponding to a primary user equipment of the aggregation group.

User equipment aggregation may minimize monitoring by inactive, or idle, user equipment devices of paging occasions or resources that correspond to the devices. Thus, monitoring for incoming calls or downlink traffic to a device by the device may be minimized while the device is idle. A network RAN typically configures multiple resource sets during a radio frame for paging transmissions. Instead of a secondary device determining which paging occasion(s) it should monitor for potential paging indications based on, for example, device identifier or cell-specific parameters, which monitoring and decoding is power/battery-inefficient due to the channel blind decoding and potential wasted battery energy if there is not any available paging indication for a device during a paging occasion, a primary, and typically more power-capable device (e.g., a device that has more battery capacity remaining than a secondary device), can monitor and blindly decode paging occasions scheduled for typically battery-power-limited secondary devices, and only wake up a secondary user equipment device if there is a paging indication directed thereto. However, this may lead to primary devices waking up frequently and attempting paging channel blind decoding for all paging occasions, including paging indication occasions corresponding to the primary user equipment device and for individual secondary devices, resulting in poor battery performance of an aggregated/primary device. Thus, an embodiment facilitates primary aggregated devices signaling a network RAN node with a request that multiple paging occasions corresponding to secondary devices of an aggregation group of device be aligned with, consecutive with, or combined within, a paging occasion corresponding to the requesting primary device. Accordingly, primary devices may only wake up during a single paging occasion, which may be an occasion that the primary device would wake up and monitor even in a non-aggregation scenario, while also facilitating a power saving gain that may typically be realized at the secondary devices in an aggregation arrangement.

To facilitate combining paging indications in a message at an occasion for which a primary user equipment device wakes up to monitor and attempt decoding in search of a paging indication corresponding to the primary device, a network RAN may overwrite a conventional paging occasion determination, mapping, scheduling, or configuration, and configure/schedule paging indications directed to multiple secondary device to be aligned with, or combined with, a single paging indication directed to a primary device corresponding to the secondary devices of an aggregation group. In an embodiment, due to capacity of a given paging occasion, (e.g., a maximum number of paging indications that can be transmitted via a paging occasion resource), a network RAN may align/combine, paging occasions directed to all, some, or no secondary devices in a paging message directed to a primary device.

An idle or inactive user equipment device may periodically wake up from a sleep state to check whether incoming calls or downlink traffic is available/buffered at a RAN serving the user equipment. Therefore, an idle device may periodically monitor and attempt to blindly decode a set of control channel resource, (e.g., a paging occasion at a given frequency and time), and upon determining a present paging indication directed to the previously idle device that performed the decoding and determining of the paging indication, the previously idle device may initiate connection establishment procedures with the network. The blind decoding of paging occasions typically wastes power/battery charge in the sense that user equipment devices tend to be in an idle state most of the time and repeatedly waking up, monitoring, and attempting to blindly decode paging occasion consumes a device's battery charge, and if there is not a paging indication present within the paging occasion directed to the device, the device has used power without detecting a paging indication and returns to a sleep state again until the next occurrence of the paging occasion when the process of waking, monitoring, and decoding repeats. Paging occasions may be assigned to a device according to a standardized process that may be unified across a network of RAN nodes and user equipment devices, and scheduling/assigning of paging occasion resources may be based on device identifiers, for example, a temporary mobile subscriber identity ("TMSI"), international mobile subscriber identity ("IMSI"), and the like, and additional cell-common parameters.

Figure 2A:
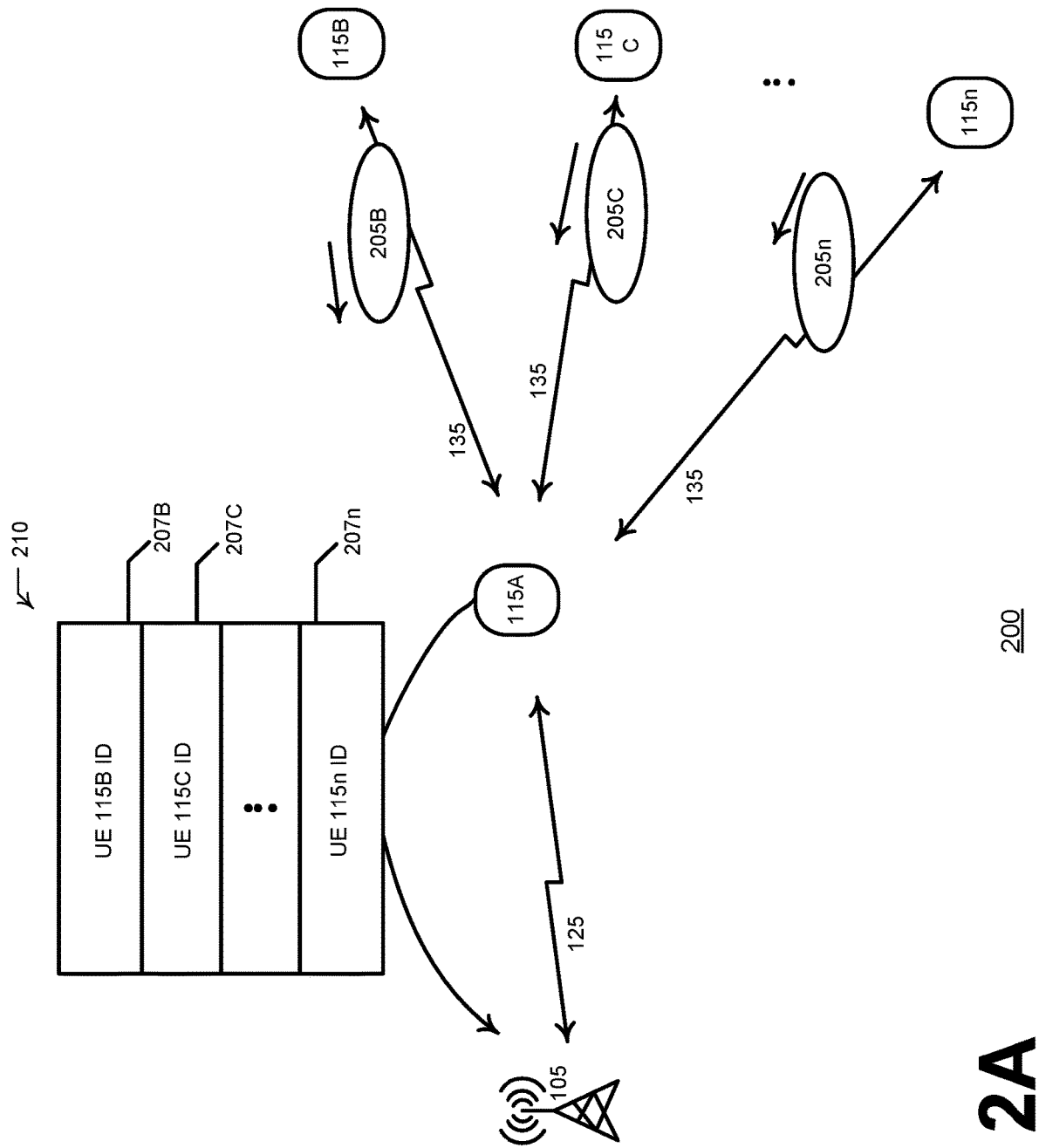
FIG. 2A illustrates an example environment with a relay user equipment to request aggregation of downlink paging indication information.

Turning now to FIG. 2A, the figure illustrates an example environment 200 comprising a relay, or primary, user equipment device 115A and secondary, remote, or tethered user equipment devices 115B, 115C, . . . 115n. UE 115A may receive remote device and paging information 205B-205n, from one or more of UE devices 115B-115n, respectively. Device and paging information 205B-205n may comprise identifiers 207B-207n, corresponding to remote UE devices 115B-115n, respectively. Relay UE device 115A may generate a request 210 that may comprise identifiers 207 of remote devices for which relay device 115A may act as a relay in an aggregation group that comprises UE 115a-UE 115n; request 210 may comprise an identifier of primary UE 115A. For example, UE 115A, as a member of an aggregation group, may perform relay services or procedures for one or more aggregation group members UE devices 115B-115n via links 135A-135n, which may be sidelink links, Wi-Fi links, Bluetooth links, or other similar links that facilitate user equipment devices communicating messages with each other without the messages necessarily being communicated or processed via RAN 105. Request 210 may be referred to as an aggregation request and may comprise a paging alignment request that requests that a downlink a paging indication directed to UE 115A and one or more paging indications directed to some of, or all of, UEs 115B-115n be combined, or aligned (e.g., temporally-consecutive occasions) in an aggregation downlink message 212 that is transmitted by RAN 105 according to configured paging indication occasion resources corresponding to UE 115A. Thus, UE 115A may wake up according to a configured downlink paging indication resource occasion, for example a configured time or frequency resource occasion 215 as shown in FIG. 2B.

Figure 2B:
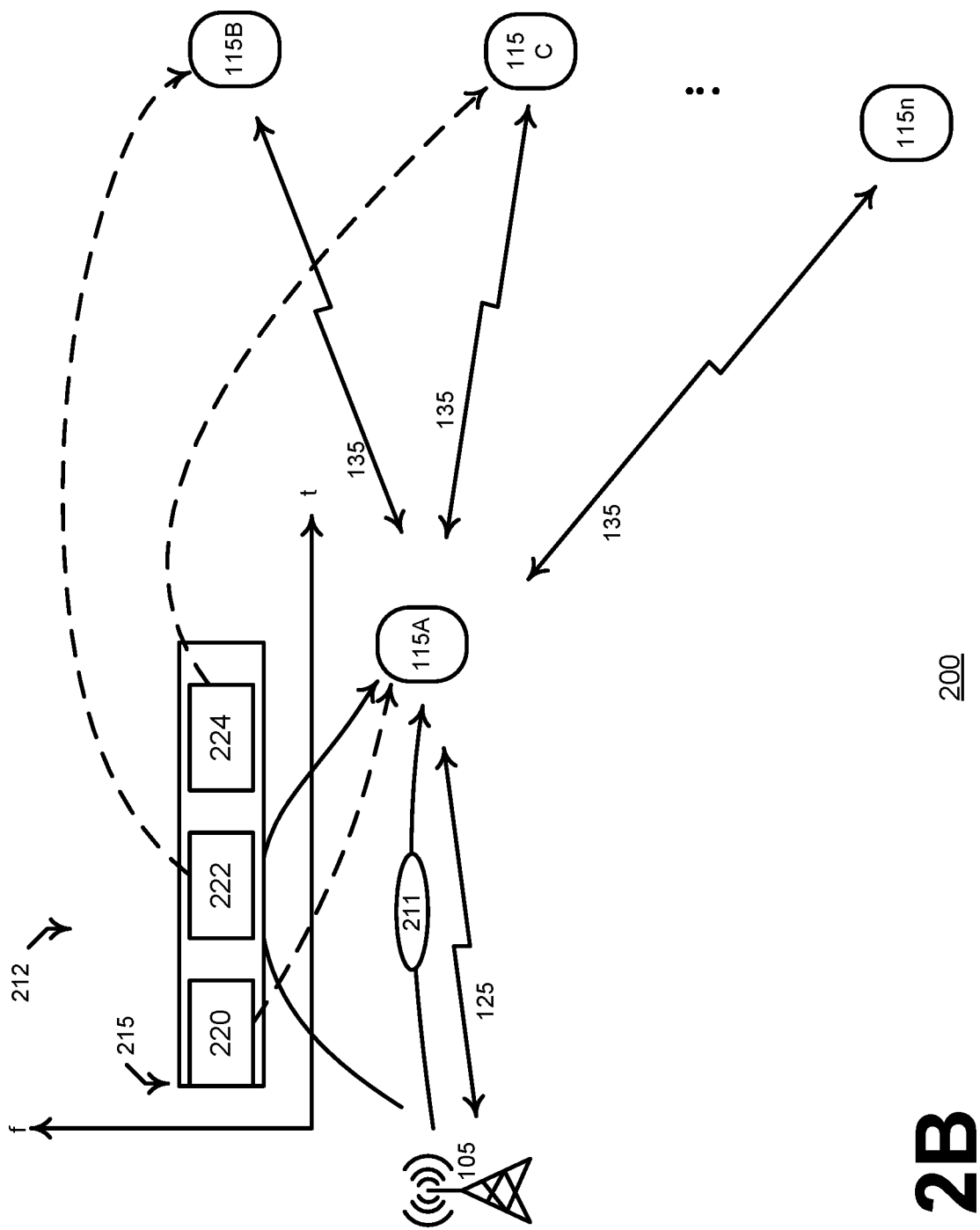
FIG. 2B illustrates an example environment with a relay user equipment to relay downlink paging indication information contained in an aggregation downlink message to a remote user equipment.

As shown in broken lines in FIG. 2B, paging resource occasion 215 may comprise paging indication 220 directed to UE 115A, paging indication 222 directed to UE 115B, and paging indication 224 directed to UE 115C. Indications 222 and 224 may be scheduled by RAN 105 at times or frequencies that are consecutive as shown in FIG. 2B or may be scheduled by the RAN for nonconsecutive times (e.g., interleaved with scheduled times for other operations by UE 115A or by other UE devices) or frequencies to be monitored by primary UE 115A without the primary UE entering a sleep state, waking back up, monitoring, and attempting to decode the occasions that may comprise indications 222 or 224. It will be appreciated that indications 222 and 224 are illustrated for purpose of discussion and that aggregation downlink message 212 may comprise paging indications directed to one or more secondary UE devices 115D-115n in addition to, or instead of, indications 222 and 224 that are directed to UE 115B and UE 115C, respectively. It will also be appreciated that the lead line arrow corresponding to reference number 212 points generally to the rectangle that encompasses paging indications 220, 222, and 224 and that the lead line arrow corresponding to reference number 215 points to the left side of the rectangle that encompasses paging indications 220, 222, and 224 to indicate the beginning, with respect to time, of a paging occasion that relay/primary UE 115A wakes up to monitor/decode for a paging indication directed to the relay/primary UE (e.g., paging indication 220). Thus, while primary/relay UE 115A is awake to monitor/decode a paging occasion for an indication that may be directed to the primary/relay UE, the primary UE stays awake and monitors/attempts to decode paging indications directed to secondary/remote user equipment, such as, for example, UE 115B or UE 115C. Accordingly, UE 115A expends less time, fewer processing resources, and less battery power to monitor/decode paging indications directed to remote devices 115B-115n. Such improvement may result from session establishment signaling messages for only a single aggregation downlink message 212 being sent back and forth between UE 115A and RAN 105 instead of messages sent back and forth between UE 115A and RAN 105 corresponding to UE 115A waking up multiple times to monitor/decode multiple, separate paging occasions, at different times or frequencies, that may correspond to respective paging indications for different remote/secondary devices (e.g., paging indications 222 or 224 respectively corresponding to UE 115B and 115C), in addition to primary UE 115A waking up to monitor/decode a paging occasion that may contain a paging indication 220 directed to the primary/relay UE itself.

Primary UE device 115A may monitor and blindly decode paging occasions scheduled for several connected secondary devices 115B-115n to reduce battery charge consumption if the paging occasions of primary UE 115A and secondary devices UEs 115B-115n are aligned/combined over, within, or corresponding to a single paging occasion resource set. This facilitates a primary user equipment device in only waking up once to monitor and attempt blind decoding for potentially receiving multiple paging indications and corresponding multiple paging occasions corresponding to multiple secondary devices as well for potentially receiving a paging indication directed to the primary UE itself. Accordingly, a power efficiency gain may be achieved at the primary device while still offering device aggregation flexibility for secondary devices. Thus, as shown by FIG. 2A, primary UE 115A may transmit a paging alignment request, or aggregation request, 210 to serving RAN node 105, wherein the aggregation request may comprise a list of device identifiers 207, such as TMSI or IMSI identifiers, corresponding to UE devices 115B-115n for which the primary UE is requesting aligning/combining of respective paging occasions with a paging occasion corresponding to the primary UE. Identifiers 207 may be obtained by primary UE 115A via standardized device-to-device sidelink communication links or via device-specific proprietary communications signaling exchange.

As depicted in FIG. 2B, network RAN 105 may reply to an aggregation request 210 (shown in FIG. 2A) with paging alignment response signaling message 211, which may indicate to requesting primary device 115A whether paging indications for all of, some of, or none of UE devices 115B-115n that are requested/identified in request 210 are accepted by RAN 105 for combining in an aggregation downlink message. Such selective configuring, or load balancing, indicated via a paging alignment response signaling message 211, gives network RAN 105 flexibility in distributing capacity available for combining paging indication occasions into different aggregation downlink messages at different available paging occasions to minimize overloading one paging occasion more than another paging occasion. When traffic is available at RAN 105 that is directed to one or more of the accepted (e.g., as indicated via message 211) secondary UE devices 115B-115C, RAN 105 may transmit respective paging indications (e.g., indications 222 and 224) via a paging occasion corresponding to primary UE 115A (e.g., via paging occasion 215) in aggregation downlink message 212 without using time or frequency resources that might otherwise have been used to transmit to UE 115A individual paging indications (e.g., 222 and 224) corresponding to the secondary devices.

Thus, primary UE device 115A, may only wake up for paging occasion 215 configured for the primary UE to wake up and blindly decode paging indications, wherein the blind decoding may comprise searching for either a UE identifier associated with the primary UE or searching for an identifier associated with one or more of the connected (e.g., a member of a aggregation group of user equipment device) secondary devices 115B-115n that may have been signaled, configured, scheduled, or indicated as accepted according to message 211. Upon detecting in aggregation downlink message 212 a present paging indication for one or more secondary device UE 115B-115n, primary UE 115A may cause the waking up of the one or more of the secondary devices for which a paging indication was contained in aggregation downlink message 212 so that the secondary devices for which a paging indication is contained in the aggregation downlink message can initiate connection to network RAN 105 to receive further downlink traffic therefrom. The causing of the waking up of a secondary UE may be implemented via conventional techniques, for example a sidelink control information message, or other message or indication to which a sleeping, or idle, UE is configured to respond by exiting a sleep state. Accordingly, a power saving gain at one or more of the secondary UE devices 11B-115n may result from the secondary devices waking up only when there is a paging indication present for them in an aggregation downlink message that is directed to primary UE 115A and a power saving gain may be realized by primary UE 115A because it only woke up for one occasions but performed monitoring a decoding of multiple paging indications while awake.

Figure 3:
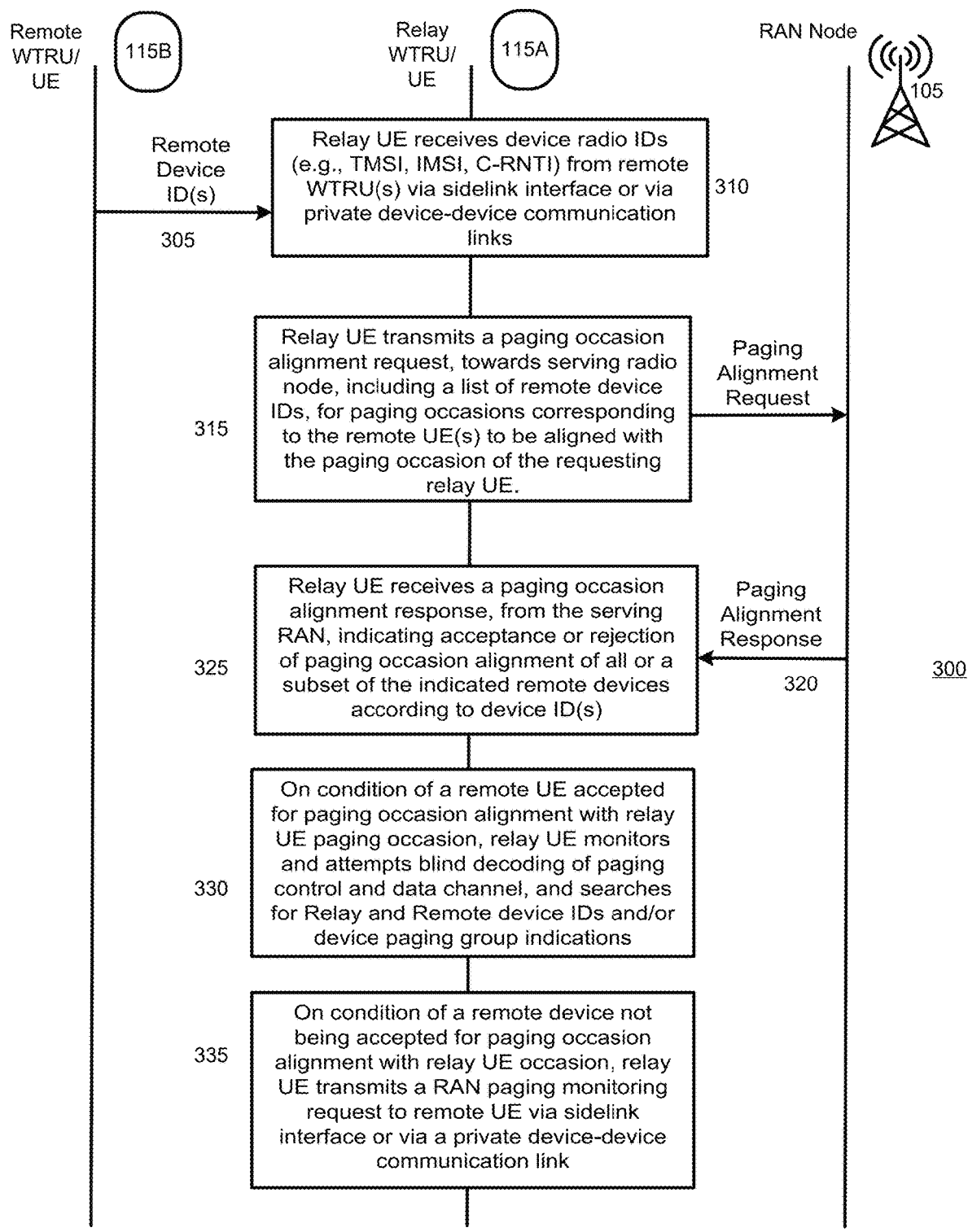
FIG. 3 illustrates a timing diagram of an example method to relay downlink paging indication messages.

Turning now to FIG. 3 the figure illustrates a timing diagram of an example method 300 comprising relay UE 115A relaying downlink paging information on behalf of UE115B. At act 305, secondary/remote UE 115B transmits, and at act 310 relay UE/WTRU 115A receives from the secondary UE, device radio identifiers, (e.g., TMIS, IMSI, or C-RNTI). The device identifiers transmitted at act 305 may be transmitted and received via a public sidelink interface, or link (e.g., link 135 shown in FIG. 2A and FIG. 2B), or via private device-to-device communication links. At act 315 in FIG. 3, primary/relay UE/WTRU 115A transmits a paging occasion alignment request (e.g., request 210 shown in FIG. 2A), which may be referred to as an aggregation request, to RAN nodes 105. The aggregation request may comprise a list of identifiers associated with remote UE device, including UE 115B, and a request for paging occasions corresponding to the remote UE devices to be aligned with a paging occasion corresponding to the requesting primary/relay UE/WTRU 115A. At act 320 RAN 105 transmits, and at act 325 primary/relay UE/WTRU 115A receives, a paging occasion alignment response message (e.g., message 211 shown in FIG. 2B) from serving RAN nodes 105. The paging occasion alignment response message may indicate acceptance, or rejection, of paging occasion alignment of paging indication occasions corresponding to all of, or a subset of, remote UE devices indicated in the request transmitted at act 315. The term 'alignment' may refer to downlink paging occasions assigned/scheduled by RAN 105 to secondary UE devices 115B-115n close in time or frequency with respect to one another and with respect to a paging occasion scheduled for primary UA 115A, for example, one occasion for one secondary UE scheduled to occur immediately after a previous paging occasion scheduled for the primary UE or another secondary user equipment, or at least close enough in time or frequency such that primary UE 115A can enter a wake state once to decode its own scheduled paging occasion and to decode one or more paging occasions scheduled for secondary user equipment while remaining in the wake state.

On condition of a remote device being an accepted remote UE, for example, a remote UE for which paging occasion(s) are accepted (e.g., according to a paging alignment response signaling message 211 described in reference to FIG. 2B) for alignment with, or combining with, a paging indication occasion corresponding to primary relay UE/WTRU 115A, at act 330 primary/relay UE/WTRU 115B may monitor and attempt blind decoding of an aggregation downlink message of a paging control channel or a data channel, searching for device identifiers corresponding to primary/relay UE 115A and secondary/remote UE 115B, or device-group paging indications (which may have been identified in message 210 described in reference to FIG. 2A). If UE 115A is able decode a paging indication occasion corresponding to secondary UE 115B from an aggregation downlink message, UE 115A may then cause remote UE 115B to wake up from a sleep state to receive paging indication information, or to receive downlink payload data traffic.

On condition of remote device UE 115B not being accepted for paging occasion alignment with a paging indication occasion corresponding to primary/relay UE/WTRU 115A, the relay UE/WTRU may transmit at act 335 a RAN paging monitoring request over the public sidelink interface or on a private device-device communication link to remote UE device 115B, which RAN paging monitoring request message transmitted at act 335 may notify the remote UE that it should wake up and monitor its own downlink paging indication occasions instead of waiting to be awakened by UE 115A to receive downlink paging indications therefrom.

Adaptive priority-aware downlink data traffic relaying to aggregated devices.

Downlink data traffic splitting procedures, even in non-device-aggregation scenarios, are typically non-priority aware. As such, downlink traffic may be split based on traffic load and link quality, regardless of the criticality of traffic to be split. With device aggregation, this may completely consume battery charge and processing capacity of primary devices receiving and processing downlink data traffic streams for secondary user equipment devices. Embodiments disclosed herein facilitate dynamically selecting and switching among delegated and non-delegated traffic streams, such that only data traffic flows, or streams, that satisfy a determined, or a configured, traffic splitting criterion, are received by a primary/relay user equipment device via higher quality and faster primary device links, while data traffic flows that do not satisfy the criterion are adaptively directed by a serving RAN to the secondary devices without intervention by a primary user equipment. Examples of a traffic splitting criterion may comprise: a traffic amount, or size, threshold, such as a configured or a determined number of bytes, a latency requirement, a quality-of-service ("QoS") associated with a data traffic flow, an application type of an application executing on a secondary user equipment to which a data traffic flow is directed, and the like.

Data traffic may be delegated for relaying by a primary/relay user equipment to a remote/secondary user equipment in an aggregation group of user equipment that may communicate with one another via a sidelink link. The primary device may be situated such that it experiences better radio conditions than the secondary user equipment devices. A serving RAN node, after receiving downlink data traffic that is directed to a connected secondary remote user equipment device of an aggregation group of user equipment devices that is situated such that the secondary device is experiencing worse downlink channel conditions than a relay/primary user equipment of the aggregation group, may transmit the traffic to the primary device for relaying of the data traffic by the primary user equipment device to the secondary user equipment instead of the RAN transmitting the data traffic flow directly to the secondary user equipment device to which the data traffic flow is directed. This may enhance spectral efficiency and receiving data rate in transmitting the data traffic flow from the RAN to the relay/primary user equipment (the data rate between the RAN and the relay/primary UE may be higher than a data rate that the RAN might be able to use if the RAN transmitted the data traffic flow directly to the remote/secondary UE).

However, according to currently used traffic splitting procedures, a RAN does account for network conditions when determining to split traffic flows and send some data traffic to a relay UE for further transmitting thereby to a secondary user equipment.

Furthermore, current procedures are implemented with an assumption that primary delegated user equipment devices are always very battery-capable and processing-capability-efficient for receiving and decoding multiple downlink traffic streams for multiple connected secondary devices, which assumption may be incorrect.

Accordingly, embodiments disclosed herein enable a relay/primary user equipment device to only receive critical downlink streams on behalf of a remote/secondary user equipment device based on a traffic splitting criterion being satisfied, while non-critical downlink data traffic flows that do not satisfy the traffic splitting criterion can be conventionally transmitted by a serving RAN to a remote/secondary device without the traffic being relayed by a primary/relay user equipment. Thus, a relay/primary user equipment device can more efficiently distribute its battery and processing capacity among multiple downlink traffic receptions directed to connected secondary devices. From a secondary device's perspective, the more critical downlink streams, with may be associated with more stringent latency and capacity targets, may still be received and processed via the higher-quality, faster communication links of the relay/primary device while non-critical, or less critical, traffic flows are received from a serving RAN by the remote/secondary user equipment devices themselves, therefore, still achieving a dynamic power saving and capacity gain from the aggregation setup.

In an embodiment, a primary user equipment device transmits a downlink traffic delegation request to a serving RAN node that indicates UE identifiers of secondary devices to be delegated, corresponding downlink data traffic flows, or streams, that may be delegated, and corresponding QoS profile identifiers or quality class indications ("QCI"). Accordingly, the network RAN may schedule critical streams, for secondary devices corresponding to the indicated QCIs or QoS profiles that satisfy a traffic splitting criterion, to be transmitted to a relay/primary user equipment device for relaying to a target secondary user equipment thereby, while scheduling other non-critical downlink data traffic streams (e.g., data traffic flows that do not satisfy the traffic splitting criterion) for transmission directly to the remote/secondary devices without the less critical traffic being directed to a relay/primary user equipment for relaying to the secondary user equipment.

Delegating downlink traffic flows to a primary device on behalf of a secondary device may facilitate a power saving gain at the secondary device and, if the radio conditions of the primary device are better than that are of the secondary device, receiving of downlink traffic through the primary device path can further reduce latency and enhance data rates. However, for efficient device aggregation, primary delegated devices may adaptively manage relaying of data traffic based on battery consumption and processing load at the primary user equipment and at various connected secondary devices. Thus, in embodiments disclosed herein, a primary device may request aggregating of, managing of, and relaying of critical downlink traffic flows directed to one or more secondary devices, which may benefit from a better data rate corresponding to better channel conditions corresponding to the primary device, while secondary devices bear processing loads and energy loads (e.g., battery consumption) for less critical traffic directed thereto.

Figure 4:
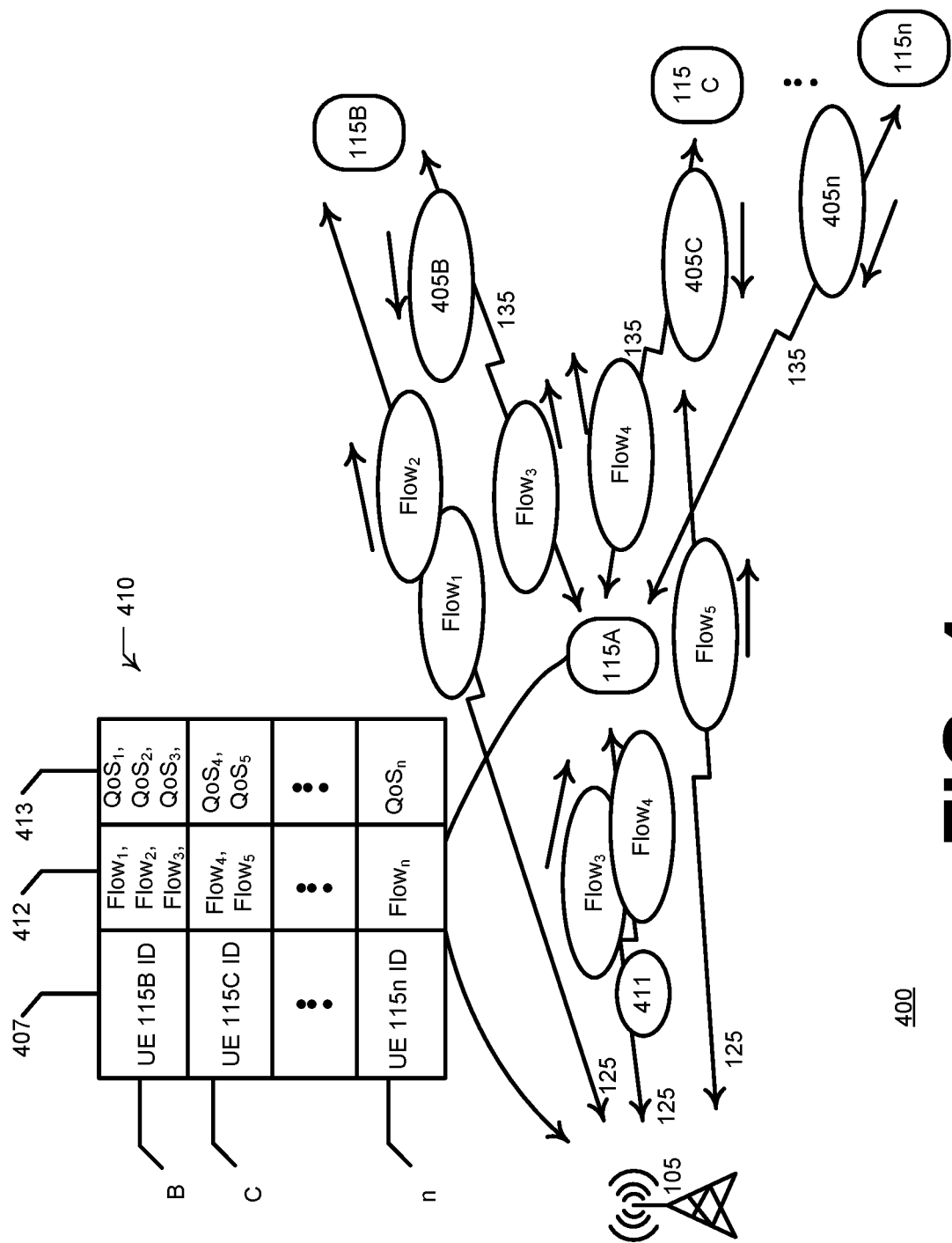
FIG. 4 illustrates an environment with a relay user equipment to relay downlink data traffic to a remote user equipment.

As shown in FIG. 4, environment 400 may comprise relay UE 115A and remote, tethered (e.g., tethered via a short-range wireless link such as a sidelink link, a Bluetooth link, a Wi-Fi link, and the like), or secondary user equipment devices 115B-115n. Primary UE device 115A may transmit a downlink traffic reception delegation request, or requests, 405, on behalf of one or more secondary devices 115B-115b. Request 410 may comprise a list of secondary device identifiers 407 for which downlink traffic is to be delegated to primary UE 115A. Request 410 may comprise a list of one or more traffic flow identifiers 412 and a list of quality identifiers 413 corresponding to the flow identifiers. Examples of the quality identifiers may comprise: QoS criterion, QCIs, QoS profile identifiers, or flow priority identifiers, that may be associated in request 410 with identifiers 412 corresponding to data traffic flows that may be available for transmission at RAN 105 to secondary devices identified by identifiers 407. Some data traffic flows corresponding to some flow identifiers 412 may be delegated, or delegable, to primary UE device 115A. Delegation of traffic flows may be determined a quality indicator 413 satisfies a delegation criterion, such as a quality-of-service criterion, which may be, or may correspond to a quality indicator 413. Other downlink data traffic flows corresponding to other flow identifiers 412 may be available for transmission at the RAN but may be transmitted to the secondary devices 115B-115n directly, based on their respective quality indicators 413, without being directed to primary UE device 115A for relay transmission thereby to one or more of the destination remote device (s) 115B-115n. RAN 105 may transmit to relay/primary UE 115a traffic flows requested by the primary UE for aggregation in request 410. In an embodiment, RAN 105 may transmit a traffic aggregation acceptance 411 message that may indicate to primary UE 115A that all of, some of, or none of the flows requested in request 410 will be transmitted to primary UE 115A for aggregation relay/forwarding to secondary user equipment 115B-115n to which the flows may be directed. In an embodiment, an acceptance message 411 may not be used, and one or more flows requested in request 410 may be transmitted to primary UE 115A for aggregation relay/ forwarding to secondary user equipment 115B-115n to which the flows may be directed.

Accordingly, primary UE device 115A may receive only delegated critical traffic flows (e.g., traffic flows that have a metric, quality identifier, or other quality-related parameter value that satisfies a quality-of-service criterion) destined for secondary device 115B-115n and may initiate a fast-forwarding procedure of the received traffic to the secondary devices. Due to a higher channel quality of primary/relay devices that may exist relative to channel qualities of secondary/remote devices, network RAN 105 can transmit critical flows with a data rate and achievable traffic reliability that corresponds to the relay/primary user equipment device 115A, which can then forward the received traffic to one or more destination remote UE(s) 115B-115n. Using, by RAN 105, a higher data rate corresponding to primary UE 115A (e.g., higher than a data rate corresponding to a secondary UE 115B-115n) to transmit data traffic that satisfies a traffic splitting/delegation criterion, for example having a quality-of-service associated with a data traffic flow that exceeds a traffic splitting quality of service threshold criterion, may result in consuming less resources for critical traffic transmissions, due to the better channel conditions (and thus, for example, less processing or packet retransmission), while maintaining performance and reliability corresponding to the traffic flow's QoS. For traffic flows requiring a lower quality-of-service than a traffic splitting/ delegating criterion, which may comprise a quality-of-service criterion, the network RAN may transmit traffic directly to one or more destination remote UE devices 115B-115n at a data rate corresponding to the remote UE(s), which data rate may be a lower data rate than a data rate that correspond to the primary/relay UE. Using a higher data rate corresponding to a relay/primary user equipment that is based on channel conditions experienced, being experienced, or expected to be experienced by the primary UE device contrasts with previous techniques used before the disclosure of embodiments described herein. With such previous techniques, a transmitting RAN transmits a delegated traffic flow to a primary UE according to a data rate that corresponds to a destination secondary UE (wherein the lower data rate may be based on channel conditions experienced by the secondary device) instead of according to a data rate that corresponds to a relay/primary UE (wherein the higher data rate may be based on channel conditions corresponding to the primary UE device).

In an example, shown in FIG. 4, request 410 comprises remote device identifiers 407B, 407C, and 407n corresponding to remote UE devices 115B, 115C, and 115n, respectively. Request 410 may be generated by, or compiled by, UE 115A using information received from secondary UE devices 115B-115n in information messages 405B, 405C, and 405n, respectively. Request 410 is shown in FIG. 4 comprising separate flow identifiers for a $Flow_1$, a $Flow_2$, and a $Flow_3$ in flow identifier block 412B, separate flow identifiers for a $Flow_4$ and a $Flow_5$ in flow identifier block 412C, and a flow identifier for a $Flow_n$ in flow identifier block 412n. Flow quality blocks 413B, 413C, and 413n are shown comprising quality identifiers, which may comprise quality of service criterion, or criteria, $QoS_1$, $QoS_2$, $QoS_3$, $QoS_4$, $QoS_5$, and $QoS_n$ corresponding to $Flow_1$, $Flow_2$, $Flow_3$, $Flow_4$, $Flow_5$, and $Flow_n$, respectively. In an embodiment, instead of representing quality of service criterion/ criteria, quality identifiers in flow quality blocks 413 may comprise flow metrics, for example, a metric determined by an application running on, or executing on, a secondary UE 115B-115n to which a flow is directed. RAN 105 may determine, from a quality identifier in a quality identifier block 413, whether a flow corresponding to the flow metric satisfies a quality-of-service criterion. Device identifiers shown in blocks 407B-407n, flow identifiers shown in blocks 412B-412n, and quality indicators shown in blocks 413B-413n, may be received via respective user equipment messages 405B-405n, which messages may also comprise decoding information corresponding to the secondary user equipment 115B-115n. In an embodiment, decoding information may comprise codes to use for blind decoding of paging indications directed to secondary UE devices 115B-115n. In an embodiment, decoding information may comprise decryption information that may be used to decrypt, or decode, data traffic directed to the secondary user equipment devices.

In the example illustrated in FIG. 4, $Flow_3$ and $Flow_4$ are shown having satisfied a quality of service criterion, for example a quality of service threshold, and are thus delegated for transmission to primary UE 115A, which receives packets of $Flow_3$ and $Flow_4$ via long range wireless links 125 and forwards packets of $Flow_3$ to and $Flow_4$ to secondary UE 115B and secondary 115C, respectively, via sidelink links 135 according to $Flow_3$ being associated with UE 115B in request 410 and $Flow_4$ being associated with UE 115C in request 410. $Flow_1$ and $Flow_2$ are shown being transmitted from RAN 105 directly to UE 115B, according to request 410 (or because aggregation delegation of $Flow_1$ or $Flow_2$ was not requested in request 410), via long range wireless links 125 because the respective quality-of-service criterion, or metric, associated with $Flow_1$ and $Flow_2$ were not satisfied or did not warrant using primary UE 115A to relay the data traffic flows $Flow_1$ and $Flow_2$ to UE 115B. Similarly, $Flow_5$ is shown being transmitted from RAN 105 directly to UE 115C, according to request 410 (or because aggregation delegation of $Flow_5$ was not requested in request 410), via long range wireless links 125 because the respective quality of service criterion, or metric, associated with $Flow_5$ was not satisfied or did not warrant using primary UE 115A to relay data traffic of $Flow_5$ to UE 115C. Thus, traffic flows $Flow_3$ and $Flow_4$, which may have a higher priority than priorities associated with $Flow_1$, $Flow_2$ and $Flow_5$, as indicated by their respective quality identifiers 413, may be transmitted from RAN 105 at a data rate, or data rates, corresponding to network or channel conditions experienced by primary UE 115A instead of data rates that might correspond to secondary UE 115B and 115C. Thus, advantage may be taken of better channel conditions, and thus support for a better/ higher data rate, for the higher priority data traffic flows, that UE 115A can facilitate, while UE 115A is not burdened with relaying traffic flows $Flow_1$, $Flow_2$, and $Flow_5$ because their respective quality of service needs, or requirements, can be adequately satisfied by potentially slower data rates that network radio conditions, or channel conditions, experienced by UE 115B or 115C may facilitate.

Figure 5:
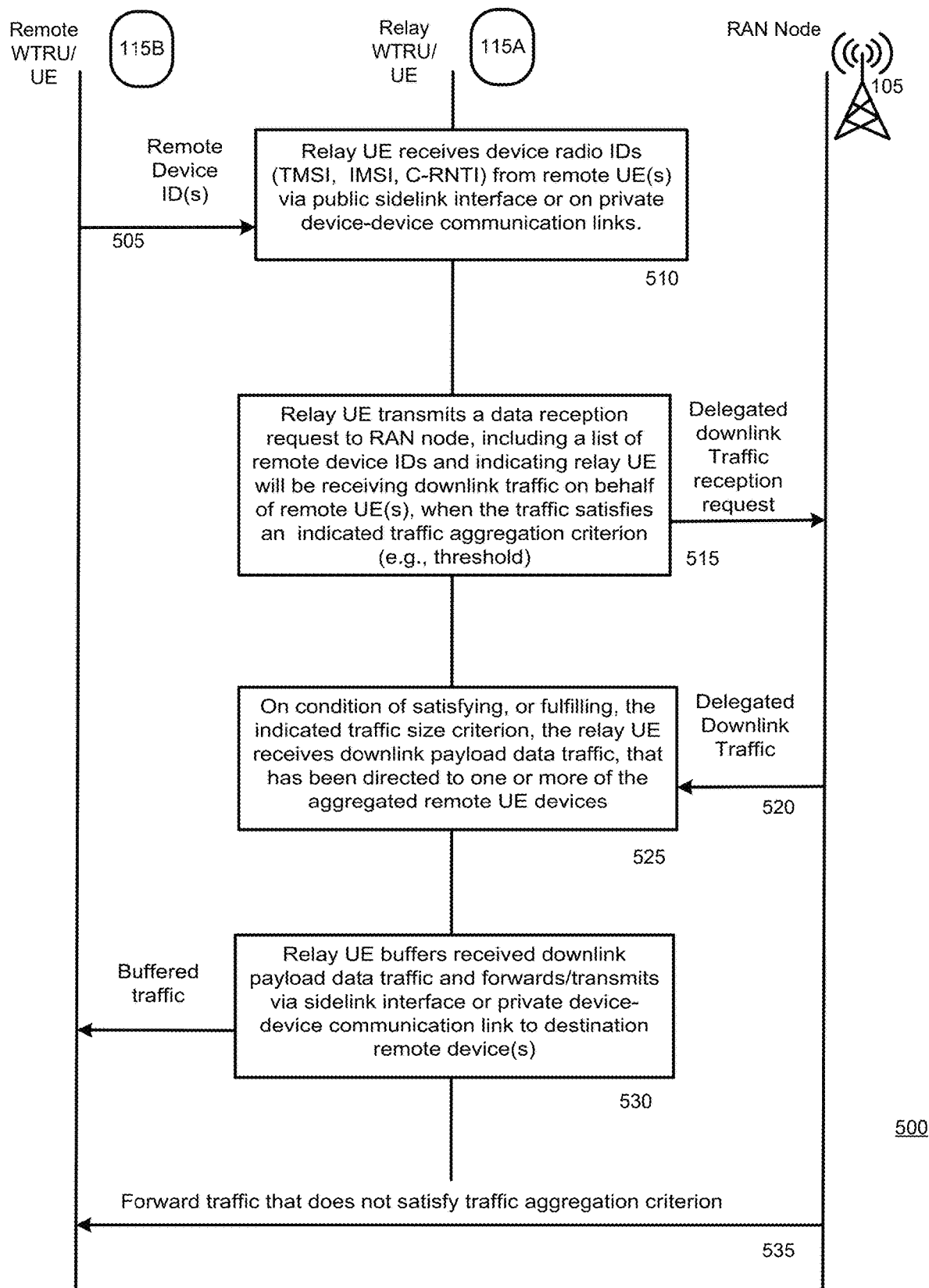
FIG. 5 illustrates a timing diagram of an example method to relay downlink data traffic.

Turning now to FIG. 5, the figure illustrates a timing diagram of an example method embodiment 500 to relay delegated aggregated data traffic in an aggregation group of user equipment from a relay user equipment, or primary user equipment, 115A to a remote, or secondary, user equipment device 115B. At act 505, UE 115B may transmit UE information to UE 115A, for example in an information message 405B described in reference to FIG. 4. UE information may comprise an identifier of UE 115B, decoding information, decrypting information, flow identifiers, quality identifiers, and the like, corresponding to UE 115B. An identifier of UE 115B transmitted at act 505 may comprise TMIS, IMSI, or C-RNTI identifiers corresponding to UE 115B, and may be received from UE 115B by UE 115A via a public sidelink interface or via a private device-device communication links. At act 510, relay/primary UE 115A receives the UE information transmitted at act 505.

At act 515, primary UE 115A generates a request, which may be referred to as a data reception request, that may comprise a traffic splitting request, or a traffic splitting configuration request, which may be a request 410 described in reference to FIG. 4 to delegate aggregation of traffic directed from RAN 105 to UE 115B via relay UE 115A. The request transmitted at act 515 may indicate that UE 115A is to receive traffic that is directed to UE 115B on behalf of UE 115B and relay the received traffic to UE 115B. The request transmitted at act 515 may comprise a quality-of-service criterion, a priority, a quality metric, or other criterion or value that corresponds to a quality associated with a data traffic flow identified in the request. In the example shown in FIG. 5, the criterion may comprise a traffic size, or an amount of traffic that is directed to UE 115B that is buffered at RAN 105. The request transmitted at act 515 may comprise a list of remote device identifiers corresponding to multiple secondary UE devices in addition to UE 115B, and may indicate that UE 115A requests the receiving of downlink data traffic on behalf of the secondary device, or devices, if the data traffic, which may be buffered at RAN 105, satisfies a traffic aggregation criterion, for example, the buffered traffic size, or amount, is below, or above, an indicated threshold. A traffic size criterion may be used if primary UE 115A cannot currently support more than the indicated threshold amount, or a size criterion may be used because channel current conditions at secondary 115B can support less than the indicated threshold for an application, executing on UE 115B, to which the data traffic flow is directed.

At act 520, RAN 105 may transmit data traffic directed to secondary user equipment devices 115B based on channel conditions, or radio conditions, of UE115A instead of based on channel conditions of secondary user equipment device 115B. The transmitting of data traffic at act 520 may be based on whether the data traffic satisfies, or does not satisfy, a quality-of-service criterion transmitted from UE 115A at act 515.

On condition of satisfying criterion indicated in the request transmitted at act 515, for example a size threshold, relay UE/WTRU 115A may receive at act 525 downlink data traffic payload, having an ultimate destination of UE 115B. The data traffic transmitted at act 520 may be transmitted by RAN 105 and received by UE 115A, according to a data rate corresponding to UE 115A. Relay UE/WTRU 115A may buffer traffic received at act 525 and may transmit the received traffic at act 530 via a sidelink interface or via a device-device communication link to UE 115B. If data traffic destined from RAN 105 to UE 115B does not satisfy a criterion, such as a size criterion, of the request transmitted at act 515, RAN 105 may transmit the data traffic directly to UE 115B at act 535 according to a data rate corresponding to UE 115B and via a long-range wireless link instead of transmitting the data traffic to UE 115A for further relaying thereby to UE 115B.

Figure 6:
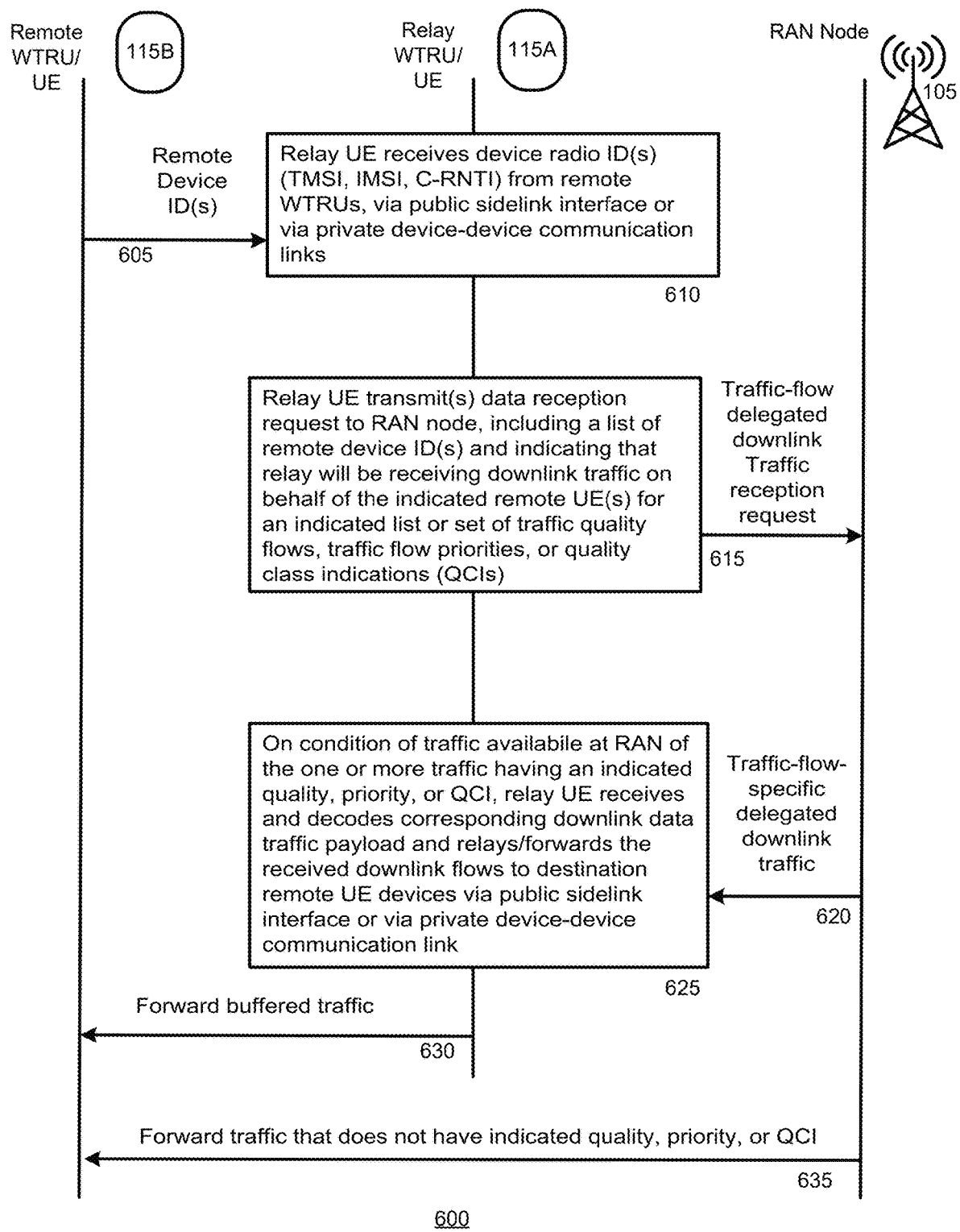
FIG. 6 illustrates a timing diagram of an example method to relay downlink data traffic based on a quality-of-service.

Turning now to FIG. 6, the figure illustrates a timing diagram of an example method embodiment 600 to relay data traffic from a relay user equipment, or primary user equipment, 115A to a remote, or secondary, user equipment device 115B according to a quality-of-service, or according to a priority, corresponding to the data traffic. The quality of service, or priority, may correspond to a traffic flow, a channel condition of a secondary UE 115B-115n, an application executing on one of the secondary user equipment devices, or one or more other factors or conditions that relate to quality-of-service. At act 605, UE 115B may transmit UE information, for example information in an information message 405B described in reference to FIG. 4. UE information may comprise an identifier of UE 115B, decoding information, decrypting information, flow identifiers, quality identifiers, and the like, corresponding to UE 115B. An identifier of UE 115B transmitted at act 605 may comprise TMIS, IMSI, or, C-RNTI identifiers corresponding to UE 115B, and may be received from UE 115B by UE 115A via a public sidelink interface or via a private device-device communication links. At act 610, relay/primary UE 115A may receive the UE information transmitted at act 605.

At act 615, primary UE 115A generates and transmits to RAN 105 a request, which may be referred to as a data reception request, that may comprise a traffic splitting request, or a traffic splitting configuration request, such as request 410 described in reference to FIG. 4. The request transmitted at act 615 may indicate that UE 115A is to receive traffic that is directed to UE 115B on behalf of UE 115B and relay the received traffic to UE 115B. The request transmitted at act 615 may comprise a traffic aggregation criterion, such as, for example, a quality-of-service criterion, a priority, a quality metric, or other criterion or value that corresponds to a quality associated with a data traffic flow identified in the request. The request transmitted at act 615 may comprise a list of remote device identifiers corresponding to multiple secondary UE devices in addition to UE 115B and may indicate that UE 115A requests the receiving of downlink data traffic on behalf of the secondary device, or devices, if the data traffic satisfies a criterion, for example, a priority or a quality of service threshold. A request transmitted at act 615 may comprise an indicated list or set of traffic flow quality requirements, traffic flow priorities, or quality class indications ("QCI"). On condition of data traffic corresponding to a traffic flow or a quality identified or indicated in a request transmitted at act 615 being buffered at RAN 105 and available for transmission to secondary UE 115B that is the destination of the buffered traffic, RAN 105 transmits the data traffic flow to relay UE/WTRU 115A, which receives the data traffic flow at act 625. Reception of data traffic at act 625 may be according to a data rate that corresponds to UE 115A instead of a data rate that corresponds to UE 115B. UE 115A decodes downlink payload rata traffic according to decoding information that may have been received from UE 115B at act 610 or that was transmitted in a request at act 615. At act 630, UE 115A transmits downlink data traffic, received at act 625, to UE 115B via a public sidelink interface or via a private device-device communication link. If RAN 105 has traffic buffered that has a destination of UE 115B, but that doesn't satisfy a criterion, or that doesn't have a priority or quality associated with it that meats a criterion, such as a priority criterion, a quality of service criterion, or a quality criterion, instead of transmitting the data traffic flow to UE 115A for forwarding/relaying thereby to UE 115B, RAN 105 may transmit at act 635 the traffic flow directly to secondary device UE 115B according to a data rate that corresponds to network or channel conditions experienced by the secondary UE.

Figure 7:
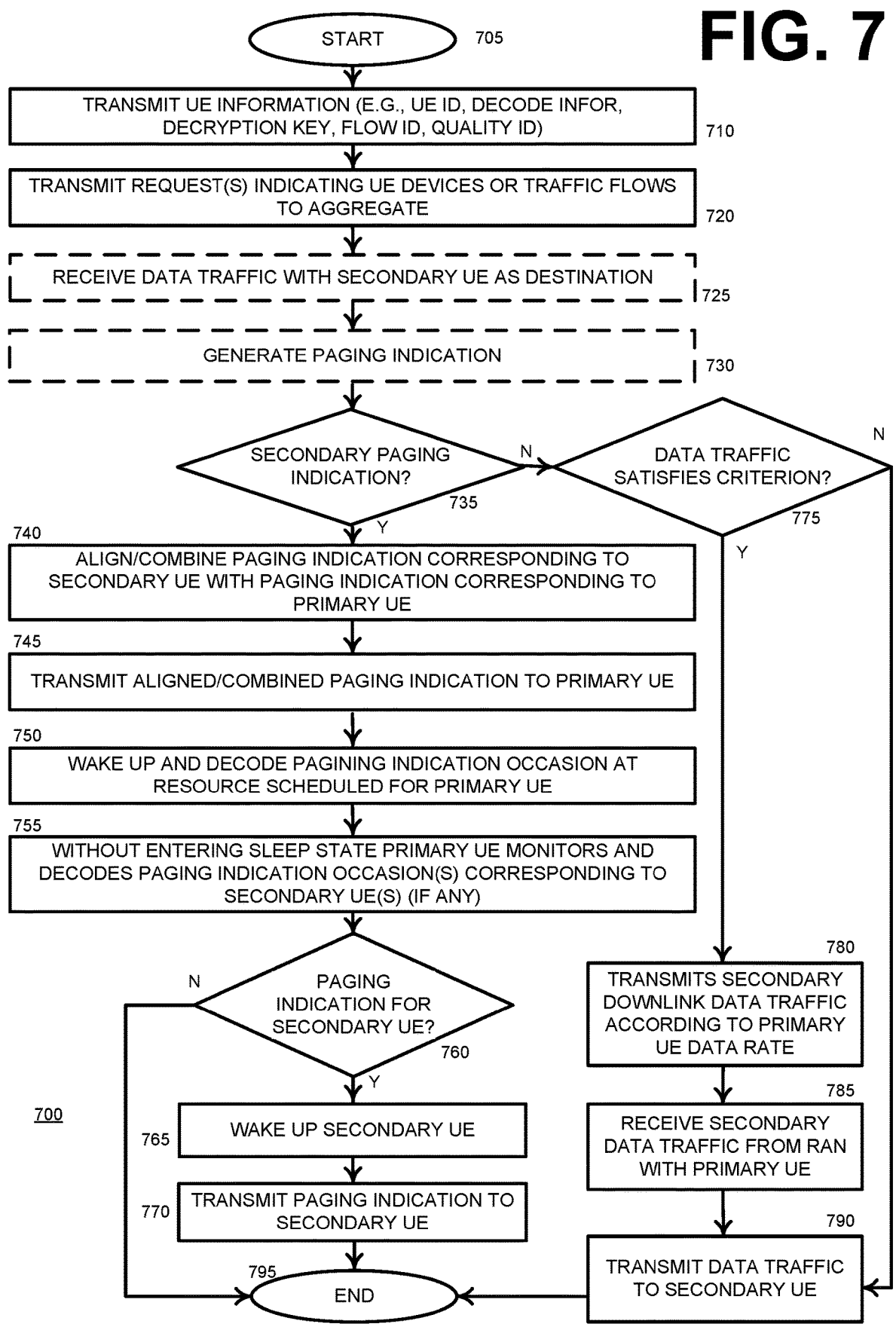
FIG. 7 illustrates a flow diagram of an example method to relay downlink traffic.

Turning now to FIG. 7, the figure illustrates a flow diagram of an example embodiment method 700 to aggregate downlink traffic from a RAN to one or more remote/secondary user equipment devices, such as UE 115B described in reference to other figures herein, via a relay/primary user equipment, such as UE 115A described in reference to other figures herein. Continuing with description of FIG. 7, method 700 begins at act 705. At act 710 a secondary user equipment transmits user equipment information to a primary user equipment. The user equipment information may comprise, for example, an identifier of the user equipment, decoding information corresponding to the user equipment that may be used to decode paging indications directed to the secondary user equipment, a decryption key that may be used to decrypt data traffic directed to the secondary user equipment, one or more flow identifiers that may correspond to data traffic flows that are currently, or that may in the future be, received by the secondary user equipment. The user equipment information may comprise a quality identifier, which may comprise, or refer to, a quality-of-service criterion, a priority of a traffic flow or of an application receiving a traffic flow, or a quality-of-service or other metric that may correspond to or indicate a quality of a traffic flow, a service, or an application receiving a traffic flow.

At act 720, the primary UE transmits to a serving RAN a request, or requests, that may indicate secondary user equipment devices or traffic flows corresponding thereto for aggregation of traffic flows or paging indications. At act 725, the RAN may receive traffic having a secondary user equipment as a destination. At act 730, the RAN may generate a paging indication, that may be a paging indication directed to a primary user equipment, or that may be a paging indication directed to a secondary user equipment. It will be appreciated that blocks 725 and 730 are shown in broken lines to indicate that only one, or both, of acts 725 or 735 may be performed during an iteration of method 700.

At act 735, the RAN may determine whether a paging indication to be directed to a secondary UE has been generated at step 730. If a determination made at act 735 is that a paging indication to be directed to a secondary user equipment was generated at act 730, method 700 advances to act 740. At act 740, the RAN may align, or combine, one or more paging indications to be directed to one or more secondary user equipment devices with a paging indication to be directed to a primary user equipment device. At act 745, the RAN transmits an aligned paging indication, which may be referred to as a aggregation downlink message, to a primary user equipment. At act 750, the primary user equipment wakes up and decodes a paging indication occasion based on previously-configured paging indication resources corresponding to the primary user equipment. For example, the primary user equipment may be configured to wake up at a time or frequency to check whether a RAN has transmitted, to the primary user equipment, a paging indication for the primary user equipment. While awake, after having awakened at act 750 and without having entered a sleep state after having awakened at act 750, at act 755 the primary user equipment monitors paging indication occasions for paging indications that correspond to secondary user equipment devices. The primary user equipment may search for paging indications directed to secondary user equipment devices based on decoding information corresponding to the secondary user equipment devices that was transmitted at act 710 by one or more secondary user equipment to the primary user equipment.

At act 760, the primary user equipment determines whether a paging indication for a secondary user equipment is contained in an aligned paging indication, or aggregation downlink message, that was transmitted at act 745. An aligned paging indication may be referred to as an aggregation downlink message and may contain paging indications for secondary user equipment devices that might have been scheduled by a RAN for different times or frequencies, but were scheduled by the RAN for transmission in an aligned manner, a consecutive manner, or a proximate manner, so that paging indications for secondary user equipment devices in an aggregation arrangement with a primary user equipment device may be decoded by the primary user equipment device while awake after decoding a downlink paging indication occasion for the primary user equipment device. If a determination is made at act 760 that a paging indication directed to a secondary user equipment was not contained in an aggregation downlink message, method 700 advances to act 795 and ends.

If, however, an aggregation downlink message contains one or more paging indications for one or more secondary user equipment devices the primary user equipment device may cause the one or more secondary user equipment devices to wake up from a sleep state at act 765. At act 770, the primary user equipment may transmit one or more paging indications that may have been contained in an aggregation downlink message to respective secondary user equipment devices. Method 700 advances to act 795 and ends.

Returning to description of act 735, if a determination is made at act 735 that a secondary paging indication has not been generated to be directed to a secondary user equipment, method 700 advances to act 775. At act 775, the RAN may determine whether data traffic that may be directed to a secondary user equipment and that was received at act 725 satisfies a criterion, for example an aggregation criterion. If the traffic satisfies an aggregation criterion, for example a priority, a quality-of-service threshold, or other criterion that may be used to distinguish quality of a traffic flow, method 700 advances to act 780. At act 780, the RAN transmits the downlink data traffic that may have been received at act 725 to a primary user equipment at a data rate that may correspond to the primary user equipment instead of at a data rate that may correspond to a secondary user equipment device to which the traffic is directed. And act 785, the primary user equipment receives traffic from the RAN that was transmitted at act 780 according to the data rate corresponding to the primary user equipment. If act 790 is reached via act 785, the primary user equipment transmits the data traffic that is to be directed to the secondary user equipment and that was received at act 785 to the secondary user equipment to which the traffic is directed via an aggregation link, for example a sidelink link. Method 700 advances to act 795 and ends.

Returning to description of act 775, if data traffic received and act 725 does not satisfy a traffic aggregation criterion, instead of transmitting the traffic to a primary user equipment at a data rate corresponding to the primary user equipment, the RAN may transmit the data traffic received at act 725 directly to the secondary user equipment to which the traffic received at act 725 is to be delivered without the traffic being transferred to a primary user equipment for ultimate relay to the secondary user equipment. After the RAN transmits the traffic at act 790, method 700 advances to act 795 and ends.

Figure 8:
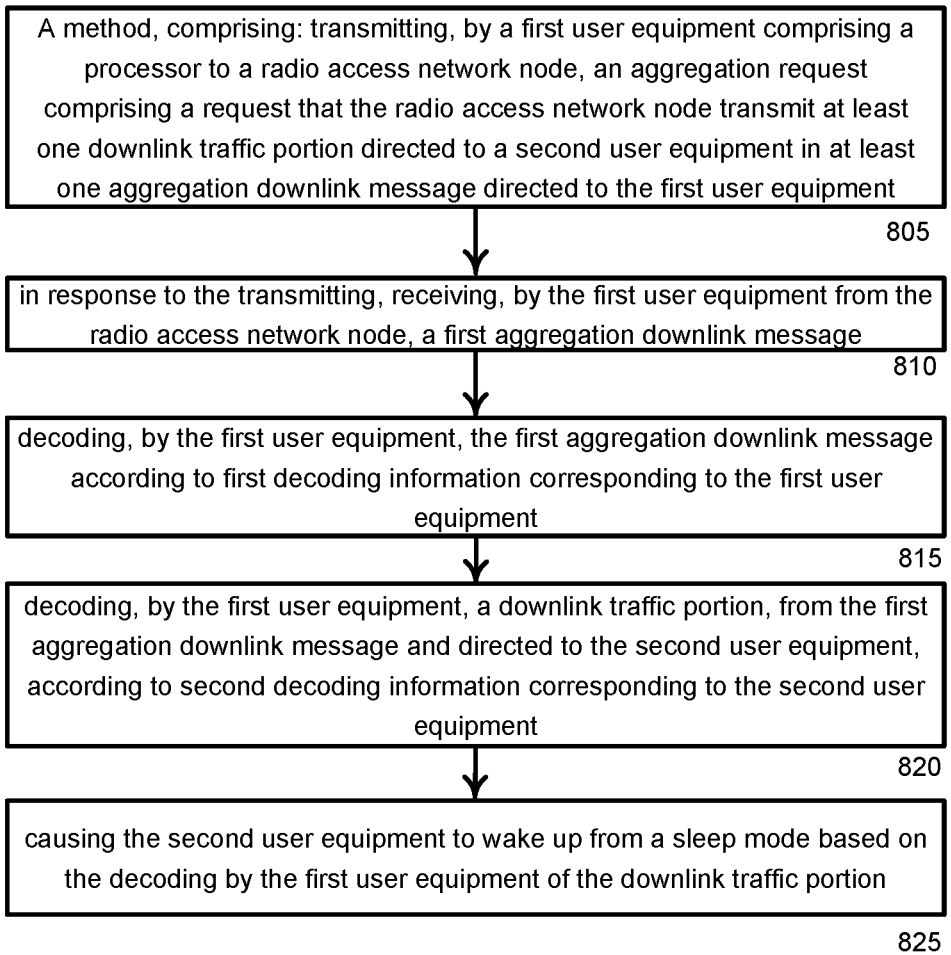
FIG. 8 illustrates a block diagram of an example method.

Turning now to FIG. 8, the figure illustrates an example embodiment method 800 comprising at block 805, transmitting, by a first user equipment comprising a processor to a radio access network node, an aggregation request comprising a request that the radio access network node transmit at least one downlink traffic portion directed to a second user equipment in at least one aggregation downlink message directed to the first user equipment; at block 810 in response to the transmitting, receiving, by the first user equipment from the radio access network node, a first aggregation downlink message; at block 815 decoding, by the first user equipment, the first aggregation downlink message according to first decoding information corresponding to the first user equipment; at block 820 decoding, by the first user equipment, a downlink traffic portion, from the first aggregation downlink message and directed to the second user equipment, according to second decoding information corresponding to the second user equipment; and at block 825 causing the second user equipment to wake up from a sleep mode based on the decoding by the first user equipment of the downlink traffic portion.

Figure 9:
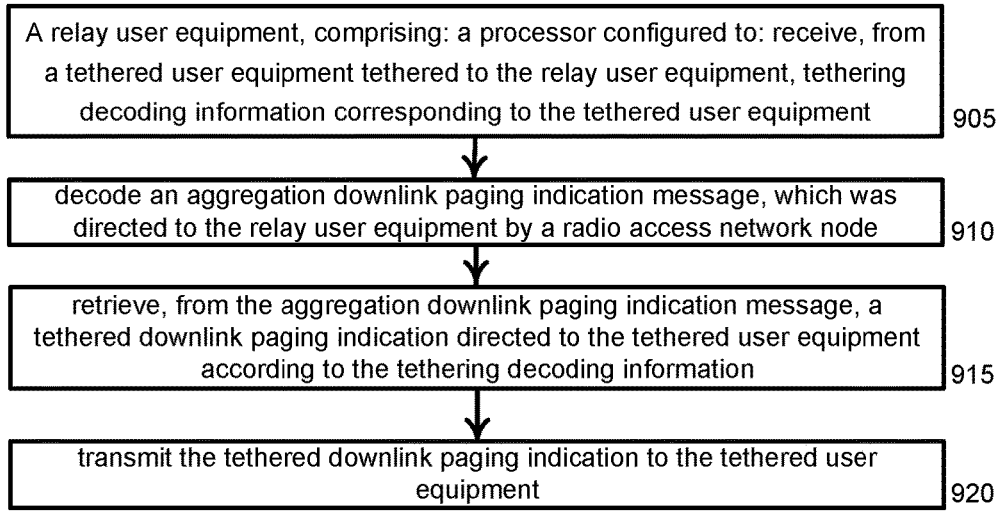
FIG. 9 illustrates a block diagram of an example relay user equipment.

Turning now to FIG. 9, the figure illustrates an example relay user equipment 900, comprising at block 905 a processor configured to: receive, from a tethered user equipment tethered to the relay user equipment, tethering decoding information corresponding to the tethered user equipment; at block 910 decode an aggregation downlink paging indication message, which was directed to the relay user equipment by a radio access network node; at block 915 retrieve, from the aggregation downlink paging indication message, a tethered downlink paging indication directed to the tethered user equipment according to the tethering decoding information; and at block 920 transmit the tethered downlink paging indication to the tethered user equipment.

Figure 10:
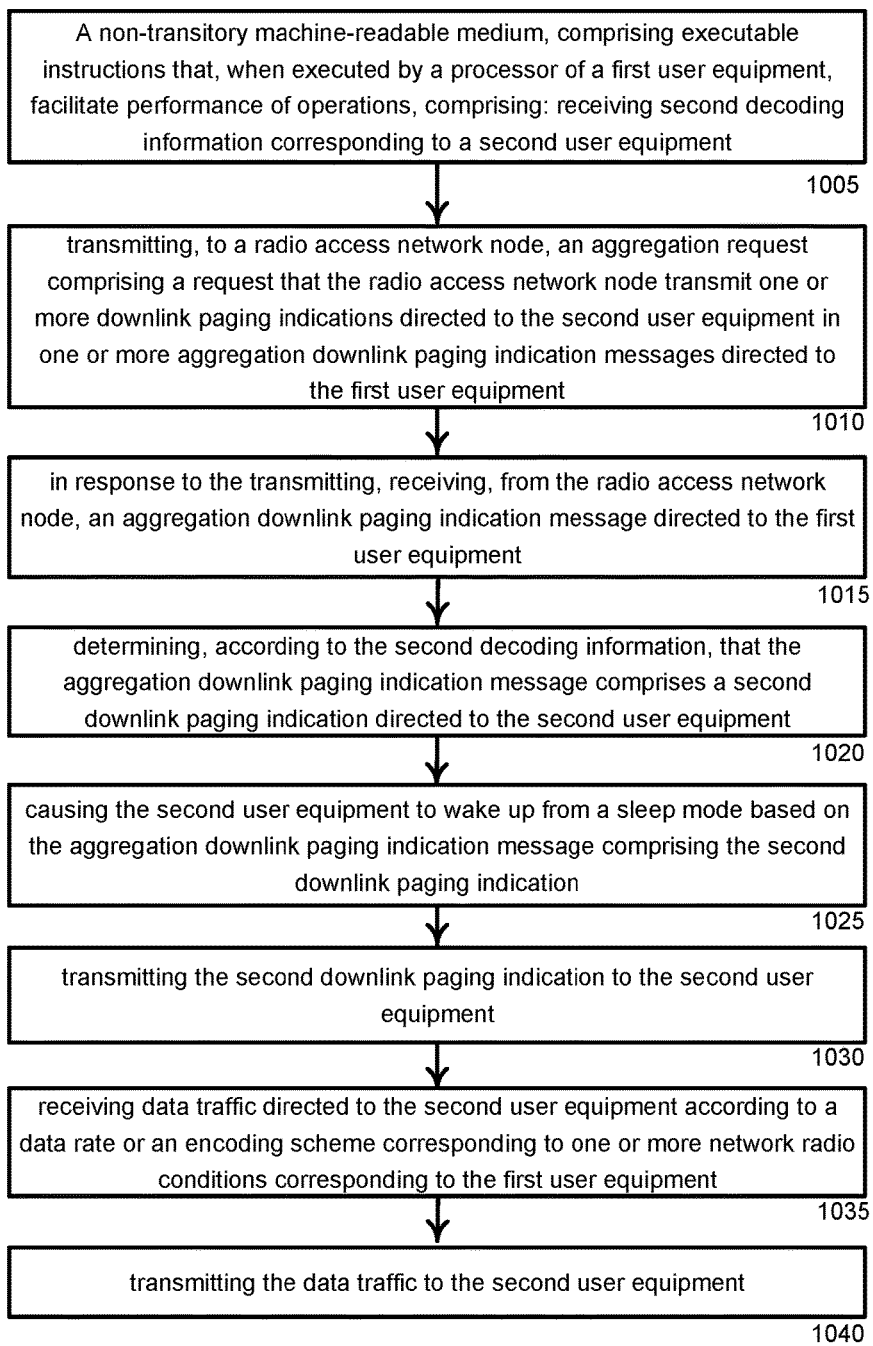
FIG. 10 illustrates a block diagram of an example non-transitory machine-readable medium.

Turning now to FIG. 10, the figure illustrates a non-transitory machine-readable medium 1000 comprising at block 1005 executable instructions that, when executed by a processor of a first user equipment, facilitate performance of operations, comprising: receiving second decoding information corresponding to a second user equipment; at block 1010 transmitting, to a radio access network node, an aggregation request comprising a request that the radio access network node transmit one or more downlink paging indications directed to the second user equipment in one or more aggregation downlink paging indication messages directed to the first user equipment; at block 1015 in response to the transmitting, receiving, from the radio access network node, an aggregation downlink paging indication message directed to the first user equipment; at block 1020 determining, according to the second decoding information, that the aggregation downlink paging indication message comprises a second downlink paging indication directed to the second user equipment; at block 1025 causing the second user equipment to wake up from a sleep mode based on the aggregation downlink paging indication message comprising the second downlink paging indication; at block 1030 transmitting the second downlink paging indication to the second user equipment; at block 1035 receiving data traffic directed to the second user equipment according to a data rate or an encoding scheme corresponding to one or more network radio conditions corresponding to the first user equipment; and at block 1040 transmitting the data traffic to the second user equipment.

Figure 11:
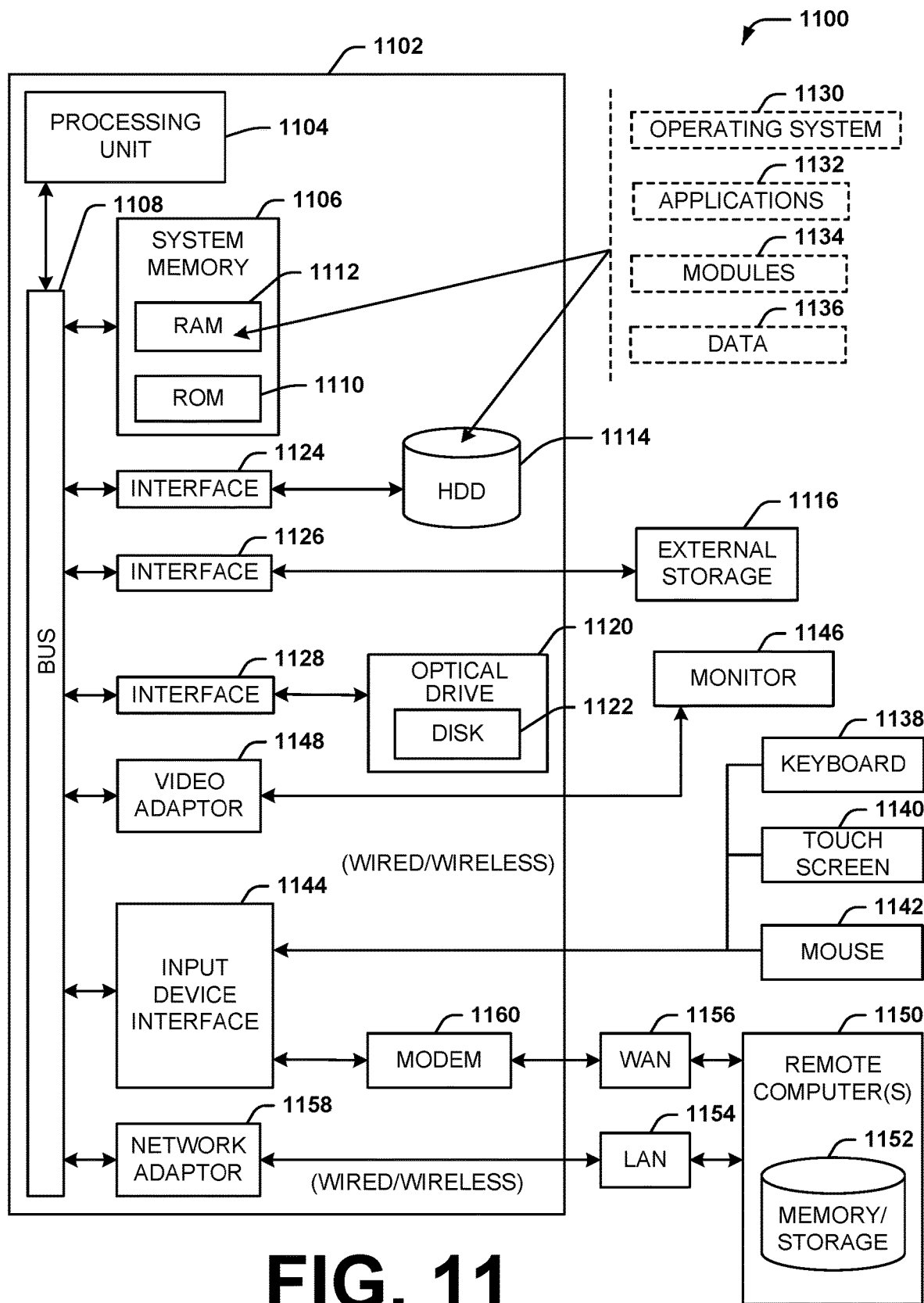
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
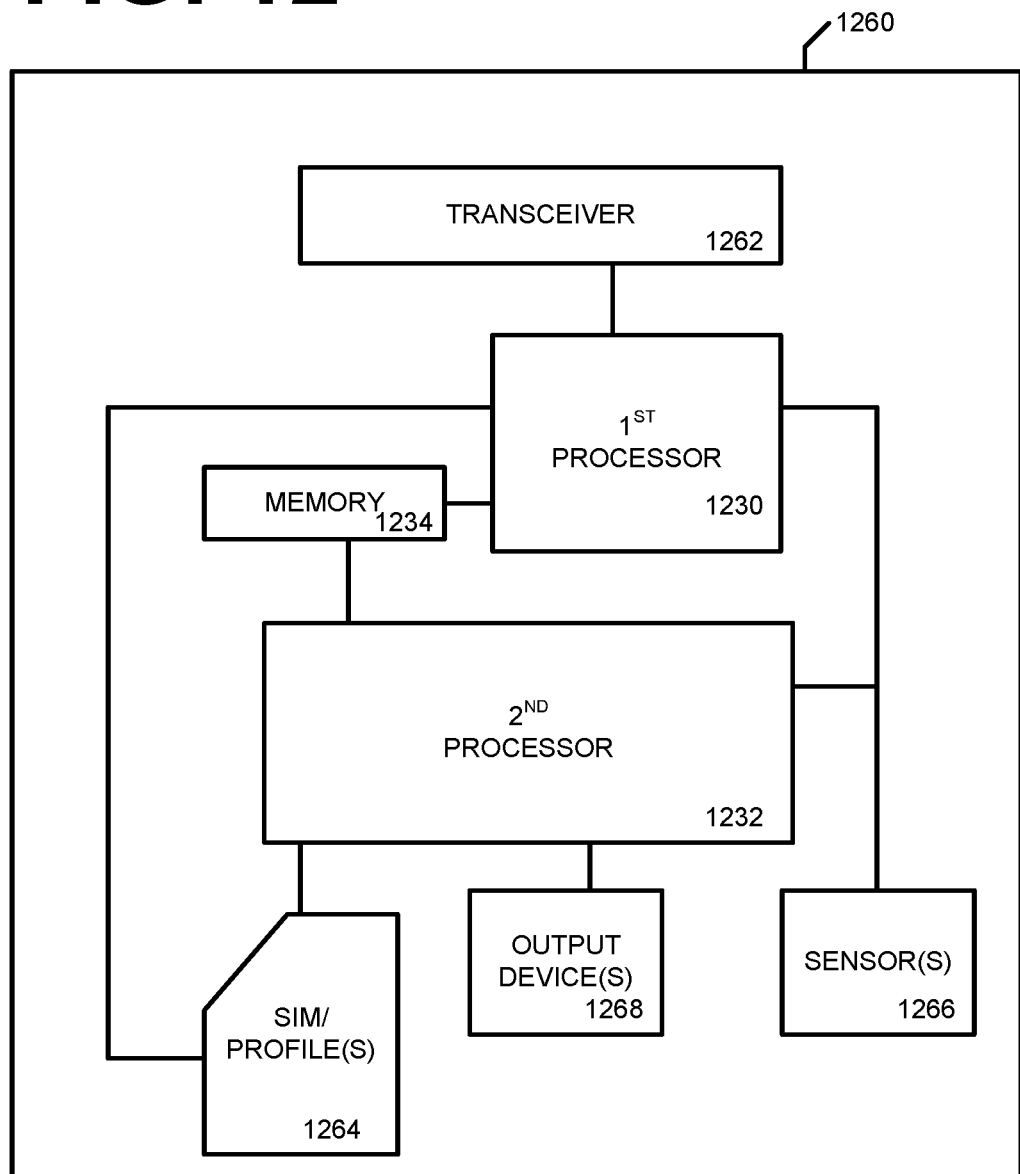
FIG. 12 illustrates a block diagram of an example wireless UE.

Turning to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, a tracking device, remote sensing devices, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 34 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 121264 that second processor 1232 may request, thus eliminating the use of the first processor acting as a 'go-between' when the second processor uses information from the SIM in performing its functions and in executing applications. First processor 1230, which may be a modem processor or a baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| QCI | QoS Class Identifiers |
| BSR | Buffer status report |
| URLLC | Ultra reliable and low latency communication |
| CBR | Channel busy ratio |
| SCI | Sidelink control information |
| DRX | Discontinuous reception |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   transmitting, by a first user equipment comprising a processor to a radio access network node, an aggregation request comprising a first request that the radio access network node transmit at least one downlink traffic portion directed to a second user equipment in at least one aggregation downlink message directed to the first user equipment;
   in response to the transmitting, receiving, by the first user equipment from the radio access network node, a first aggregation downlink message;
   decoding, by the first user equipment, the first aggregation downlink message according to first decoding information corresponding to the first user equipment;

decoding, by the first user equipment, a downlink traffic portion, from the first aggregation downlink message and directed to the second user equipment, according to second decoding information corresponding to the second user equipment; and causing the second user equipment to wake up from a sleep mode based on the decoding by the first user equipment of the downlink traffic portion, wherein the downlink traffic portion is a first downlink traffic portion, and wherein the aggregation request comprises a second request that the radio access network node transmit at least one second downlink traffic portion directed to a third user equipment in the at least one aggregation downlink message directed to the first user equipment.

2. The method of claim 1, wherein the receiving of the first aggregation downlink message comprises waking up, by the first user equipment, from a sleep state according to a configured first downlink paging occasion resource corresponding to the first user equipment.

3. The method of claim 2, wherein the decoding of the first aggregation downlink message and the decoding of the downlink traffic portion result from the waking up from the sleep state according to the configured first downlink paging occasion resource.

4. The method of claim 1, wherein the second decoding information comprises a scrambling code corresponding to the second user equipment.

5. The method of claim 1, wherein the second decoding information comprises a decryption key corresponding to the second user equipment.

6. The method of claim 1, further comprising:
decoding, by the first user equipment, a second downlink traffic portion, from the first aggregation downlink message and directed to the third user equipment, according to third decoding information corresponding to the third user equipment; and
causing the third user equipment to wake up from a sleep state based on the decoding by the first user equipment of the second downlink traffic portion.

7. The method of claim 1, further comprising:
in further response to the transmitting, receiving, by the first user equipment from the radio access network node, a second aggregation downlink message;
decoding, by the first user equipment, the second aggregation downlink message according to the first decoding information corresponding to the first user equipment;
decoding, by the first user equipment, a second downlink traffic portion, from the second aggregation downlink message and directed to the third user equipment, according to third decoding information corresponding to the third user equipment; and
causing the third user equipment to wake up from a sleep state based on the decoding by the first user equipment of the second downlink traffic portion.

8. The method of claim 1, further comprising:
receiving, by the first user equipment, data traffic directed to the second user equipment according to a data rate or an encoding scheme corresponding to a radio condition corresponding to the first user equipment; and
transmitting, by the first user equipment to the second user equipment, the data traffic;
wherein the downlink traffic portion is different from the data traffic.

9. The method of claim 1, wherein the aggregation request comprises a third request that the radio access network node transmit data traffic, having a determined quality of service that satisfies a configured quality of service criterion and that is directed to the second user equipment, to the first user equipment for retransmission by the first user equipment to the second user equipment, the method further comprising:
receiving, by the first user equipment, a data traffic portion, having the determined quality of service and that is directed to the second user equipment; and
transmitting, by the first user equipment to the second user equipment, the data traffic portion,
wherein the downlink traffic portion is different from the data traffic portion.

10. The method of claim 9, wherein the configured quality of service criterion comprises a latency value.

11. The method of claim 9, wherein the configured quality of service criterion comprises an application type corresponding to an application, executing on the second user equipment, to which the data traffic portion is directed.

12. The method of claim 11, wherein the application type comprises a type associated with a virtual reality capability.

13. The method of claim 1, wherein the at least one aggregation downlink message directed to the first user equipment comprises a second aggregation downlink message, wherein the aggregation request comprises a third request that the radio access network node transmit at least one third downlink traffic portion directed to a fourth user equipment, and wherein the method further comprises:
receiving, by the first user equipment via the second aggregation downlink message, the at least one third downlink traffic portion directed to the fourth user equipment, wherein the first aggregation downlink message and the second aggregation downlink message are different.

14. The method of claim 13, wherein the first aggregation downlink message comprises a first paging indication directed to the second user equipment, a second paging indication directed to the third user equipment, and wherein the second aggregation downlink message comprises a third paging indication directed to the fourth user equipment.

15. A relay user equipment, comprising:
a processor configured to:
receive, from a tethered user equipment tethered to the relay user equipment, tethering decoding information corresponding to the tethered user equipment;
decode an aggregation downlink paging indication message, which was directed to the relay user equipment by a radio access network node;
retrieve, from the aggregation downlink paging indication message, a tethered downlink paging indication directed to the tethered user equipment according to the tethering decoding information;
transmit the tethered downlink paging indication to the tethered user equipment;
transmit, to the radio access network node, an aggregation request comprising a configured quality of service criterion;
receive, from the radio access network node, a data traffic portion having a determined quality of service that satisfies the configured quality of service criterion and that is directed to the tethered user equipment; and
transmit, to the tethered user equipment, the data traffic portion,
wherein the tethered downlink paging indication is different from the data traffic portion.

16. The relay user equipment of claim 15, the processor further configured to:

receive data traffic directed to the tethered user equipment; and transmit the data traffic according to at least one downlink resource indicated in the tethered downlink paging indication.

17. The relay user equipment of claim 15, the processor further configured to:

receive data traffic directed to the tethered user equipment according to a data rate or an encoding scheme corresponding to one or more network radio conditions corresponding to the relay user equipment; and transmit the data traffic to the tethered user equipment.

18. A non-transitory machine-readable medium, comprising executable instructions that, when executed by a processor of a first user equipment, facilitate performance of operations, comprising:

receiving second decoding information corresponding to a second user equipment;

transmitting, to a radio access network node, an aggregation request comprising a request that the radio access network node transmit one or more downlink paging indications directed to the second user equipment in one or more aggregation downlink paging indication messages directed to the first user equipment;

in response to the transmitting, receiving, from the radio access network node, an aggregation downlink paging indication message directed to the first user equipment;

determining, according to the second decoding information, that the aggregation downlink paging indication message comprises a second downlink paging indication directed to the second user equipment;

causing the second user equipment to wake up from a sleep mode based on the aggregation downlink paging indication message comprising the second downlink paging indication;

transmitting the second downlink paging indication to the second user equipment;

receiving data traffic directed to the second user equipment; and transmitting the data traffic according to one or more downlink resources indicated in the second downlink paging indication, wherein the data traffic has a determined quality of service that satisfies a quality-of-service criterion specified in the aggregation request.

19. The non-transitory machine-readable medium of claim 18, wherein the data traffic is received according to a data rate or an encoding scheme corresponding to one or more network radio conditions corresponding to the first user equipment.

20. The non-transitory machine-readable medium of claim 18, wherein the aggregation request further comprises a request that the radio access network node transmit one or more downlink paging indications directed to a third user equipment in the one or more aggregation downlink paging indication messages directed to the first user equipment, wherein the aggregation downlink paging indication message comprises a third downlink paging indication, directed to the third user equipment; and wherein the operations further comprise:

causing the third user equipment to wake up from a sleep mode based on the aggregation downlink paging indication message comprising the third downlink paging indication; and transmitting the third downlink paging indication to the third user equipment, wherein the second downlink paging indication and the third downlink paging indication are different.

* * * * *